United States Patent [19]
Masuda

[11] Patent Number: 5,987,291
[45] Date of Patent: Nov. 16, 1999

[54] IMAGE FORMING APPARATUS AND A SHEET CARRYING APPARATUS

[75] Inventor: Koji Masuda, Nakai-machi, Japan

[73] Assignee: Fuji Xerox Co., Ltd., Tokyo, Japan

[21] Appl. No.: 09/065,518

[22] Filed: Apr. 24, 1998

[30] Foreign Application Priority Data

May 6, 1997 [JP] Japan ..................................... 9-115549

[51] Int. Cl.$^6$ ........................... G03G 15/14; G03G 21/00
[52] U.S. Cl. .......................... 399/302; 399/299; 399/306; 399/308; 492/8
[58] Field of Search ..................................... 399/299, 302, 399/303, 306, 308, 301; 271/901; 492/8

[56] References Cited

U.S. PATENT DOCUMENTS 3,150,419  9/1964  Aurich ......................................... 492/8
5,671,472  9/1997  Snelling .

FOREIGN PATENT DOCUMENTS

A-62-205372  9/1987  Japan .
A-64-31173   2/1989  Japan .
B2-6-13373   2/1994  Japan .

Primary Examiner—Richard Moses
Attorney, Agent, or Firm—Oliff & Berridge, PLC

[57] ABSTRACT

A sheet carrying apparatus capable of carrying sheets at a stable speed at which a transfer belt will not be waved or wrinkled and an image forming apparatus for providing high-quality images. In opposition to a drive roll for driving the transfer belt, an opposing member magnetically attracted to the drive roll is arranged.

12 Claims, 17 Drawing Sheets

(A)

(B)

(A)

(B)

IMAGE FORMING APPARATUS AND A SHEET CARRYING APPARATUS

BACKGROUND OF THE INVENTION

1. Field of the Invention

The present invention generally relates to an image forming apparatus for forming by use of an electrostatic latent image for example. To be more particular, the present invention relates to an image forming apparatus for forming monochromatic and color images by use of electrophotographic recording, electrostatic recording, ionography, or magnetic recording.

2. Description of Related Art

Recently, many color image forming apparatuses have been developed for commercial use. Especially, a color image forming apparatus having a plurality of image supporters for supporting toner image formation has been developed by making the most of its high image productivity along with a conventional color image forming apparatus for obtaining one piece of image by a plurality of rotations (for example, four rotations). Such a color image forming apparatus having a plurality of image supporters (this color image forming apparatus is hereafter referred to as a tandem-type color image forming apparatus) widely uses a belt-like toner image carrier for carrying the transfer of a toner image from the plurality of image supporters by circulating along these image supporters or a belt-like toner image carrier for carrying a toner support sheet for receiving the transfer of a toner image. These toner image carriers provides advantages that it is easy to form a transfer plane abutting a plurality of image supporters arranged generally linearly and an appropriate contact is obtained by use of belt flexibility without damaging the image carrier. At the same time, the toner image carriers of this type have a disadvantage that instability in belt carriage makes it very difficult to make alignment of color toner images, one of the most important factors for defining color image quality. These toner image carriers have another disadvantage that plural sets of color image forming units each composed of an image supporter and an image forming member around the image supporter result in an increased size of the entire image forming apparatus.

FIG. 17 shows an example of the constitution of a conventional image forming apparatus. Shown in the figure are four photosensitive drums 1, 2, 3, and 4 and a belt-like toner carrier 5 that is wound around a drive roll 6 and follower roll 7 to move along these four photosensitive drums 1, 2, 3, and 4. The photosensitive drums 1, 2, 3, and 4 are arranged thereabout with charging units 11, 21, 31, and 41 for uniformly charging the photosensitive drums, exposure units 12, 22, 32, and 42 for exposing the photosensitive drums to form an electrostatic latent image, developing units 13, 23, 33, and 43 for developing the electrostatic latent image with color toners to form toner images of these colors, and cleaning units 14, 24, 34, and 44 for removing residual toners from the photosensitive drums, respectively. The belt-like toner carrier 5 may be either a so-called intermediate transfer member that directly carries a toner image or a so-called transfer paper carrying member that sucks a toner image support sheet such as a transfer paper onto the belt-like toner carrier 5. Hereafter, the toner image carrier for carrying a toner image by directly supporting the same and a belt-like toner image carrier for carrying the toner image support sheet for supporting a toner image maybe collectively referred to as a transfer belt.

The following describes details of an image forming process. First, the photosensitive drum 1 is uniformly charged and then exposed. An electrostatic latent image formed by the exposure is developed with toner. A resultant visible toner image is transferred by a transfer unit not shown onto the transfer belt 5 at a transfer position contacting the transfer belt 5. When this first toner image comes to a position at which the first toner image contacts the photosensitive drum 2, a toner image formed likewise on the photosensitive drum 2 is superimposed as a second toner image onto the first toner image. Likewise, a third toner image and a fourth toner image are sequentially superimposed to form a toner image of four colors on the transfer belt. However, while the transfer belt travels along the four photosensitive drums, the travel speed of the transfer belt cyclically varies due to out-of-roundness or eccentricity of the drive roll 6 for driving the transfer belt. This causes a delicate shift in alignment of the toner images of the four colors, failing to provide a desired image. In order to prevent this problem from occurring, various methods of securing the alignment have been employed.

In one of these methods, an image defined for position sensing is developed and transferred, the position of this image is read by an image sensor, the position of each color is calculated, and the shift in alignment is corrected by correcting the exposure timing of the exposure units 12, 22, 32, and 42 or minutely adjusting the position of the reflection mirror of the light source in each exposure unit. However, this method requires a very complicated mechanism and therefore increases fabrication cost.

In order to avoid this problem, methods are disclosed in Japanese Published Examined Patent Application No. Hei 6-13373, Japanese Published Unexamined Patent Application No. Sho 62-205372, and Japanese Published Unexamined Patent Application No. Hei 1-31173 in which the distance between the transfer positions of the plurality of photosensitive drums 1, 2, 3, and 4 is set to a value equivalent to an integral multiple of a distance traveled by the transfer belt 5 when the drive roll 6 has made one full rotation. To be more specific, the relationship between distance L between transfer positions and diameter D of the drive roll shown in FIG. 17 is $L = n \pi D$ (n being an integer). According to this method, the phase angle of eccentricity of the drive roll 6 at the time of transferring the toner image of each color is made constant for all other toner images, thereby canceling the relative color offset in the image to be transferred.

Recently, the size of the apparatuses such as those mentioned above has been significantly decreasing. Therefore, application of the above-mentioned technique reduces the diameters of the photosensitive drums 1, 2, 3, and 4 as well as distance L therebetween as shown in FIG. 18. The diameter $D = L/n \pi$ (n being an integer) of the drive roll must also be made smaller. When the diameter of the drive roll 6 is made smaller, a deflection is caused in the drive roll 6 due to the tension of the transfer belt 5 wound thereabout, a problem not negligible. The deflection is inversely proportional to the secondary moment of area of the drive roll 6 itself, namely diameter D raised to the fourth power. This is graphically represented in FIG. 19. In FIG. 19, a dashed-line curve represents a maximum deflection with roll diameter D=10 mm being 100. A solid-line curve represents the secondary moment of area with roll diameter D=10 mm being 1. Thus, the graph of FIG. 19 indicates that the deflection varies drastically with the roll diameter. Therefore, as the diameter D of the drive roll 6 decreases as shown in the example of FIG. 18, the deflection caused in the drive roll 6 increases drastically. As a result, there occur problems in which waving caused on the transfer belt 5 disables uniform transfer or correct color alignment or which cause a wrinkle on the transfer belt to remain unremoved, thereby making the transfer belt unavailable thereafter. The waving on the transfer belt due to the deflection of the drive roll causes problems not only in color image formation but also in monochromatic image formation, in which poor transfer or, in the case of a transfer belt on which transfer paper or the like is put, failure of carrying the transfer paper is caused.

The above-mentioned Japanese Published Examined Patent Application No. Hei 6-13373 discloses an example in which a follower roll 7 around which the transfer belt 5 is wound and the drive roll 6 having a diameter matching the distance between transfer positions (the distance between photosensitive drums) are arranged separately as shown in FIG. 20. However, in this arrangement, the speed and position of the transfer belt 5 that actually passes the photosensitive drums 1, 2, 3, and 4 are affected by the eccentricity and out-of-roundness of the follower roll 7, so that, as with the drive roll, relationship of $d=L/m\pi$ (m being an integer) is also required for the follower roll 7 relative to its diameter d. Eventually, aligning the phases of the toner images of the colors requires the follower roll 7 to have diameter $d=L/\pi$ (m=1) at most. Therefore, if L is small, d must be small accordingly, thereby causing the problem of deflection due to the tension of the transfer belt 5.

If a load is applied to the transfer belt 5 by passing the same between the drive roll 6 and a pinch roll 8 as shown in FIG. 20, the load is actually applied to the shaft of each of the rolls at both ends thereof as shown in FIG. 21, thereby causing a large deflection on the drive roll 6 also of a small diameter. This causes a gap between the rolls at the center thereof, which in turn causes poor application of the load, resulting in poor transmission of carrying force or uneven pressure distribution, which may cause such troubles as wrinkles on the transfer belt. FIG. 22 shows a method in which a pressing member 57 for urging the drive roll 6 especially at the center thereof is arranged to decrease the deflection. However, in this arrangement, because a compressing force is applied to a part of the surface of the drive roll, that part is easily exposed to such troubles as scratch, dent, and wear, thereby significantly decreasing the durability of the drive roll 6. Another well-known method is that a uniform pressure is generated by the drive roll and the opposing member such as a pinch roll are urged to each other by mutually tilting these rolls by a small angle from parallel direction. However, this arrangement applies undue shear force to the belt, thereby causing damages such as wrinkle and crack on the belt and reducing the durability of the belt.

SUMMARY OF THE INVENTION

It is therefore an object of the present invention to provide an image forming apparatus capable of carrying a toner image itself or a toner support sheet at a stable speed without waving or wrinkling a toner image carrier to provide high-quality images and a sheet carrying apparatus capable of carrying a sheet such as paper with stability.

In carrying out the invention and according to one aspect thereof, there is provided an image forming apparatus comprising: a toner image carrier shaped like a belt for supportingly carrying one of a toner image itself and a toner image support sheet for supporting a toner image; a toner image forming means for forming a toner image onto the toner image carrier or the toner image support sheet supported on the toner image carrier; a moving means for moving the toner image carrier, the moving means having a drive roll for driving the toner image carrier and an opposing member arranged in opposition to the drive roll with the toner image carrier in between; a magnetic force imparting means for making the drive roll and the opposing member press each other by magnetic attraction; and a fixing means for forming an image constituted by a fixed toner image onto either the toner image support sheet or a toner image transferred sheet that receives transfer of a toner image from the toner image carrier.

In carrying out the invention and according to another aspect thereof, there is provided a sheet carrying apparatus comprising: a sheet carrier shaped like a belt for supportingly carrying a predetermined sheet; a moving means having a drive roll for driving the sheet carrier and an opposing member in opposition to the drive roll with the sheet carrier in between; and a magnetic force imparting means for making the drive roll and the opposing member press each other by magnetic attraction.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings.

FIG. 1 through FIG. 5 illustrate examples of monochromatic image forming apparatuses.

Figure 1:
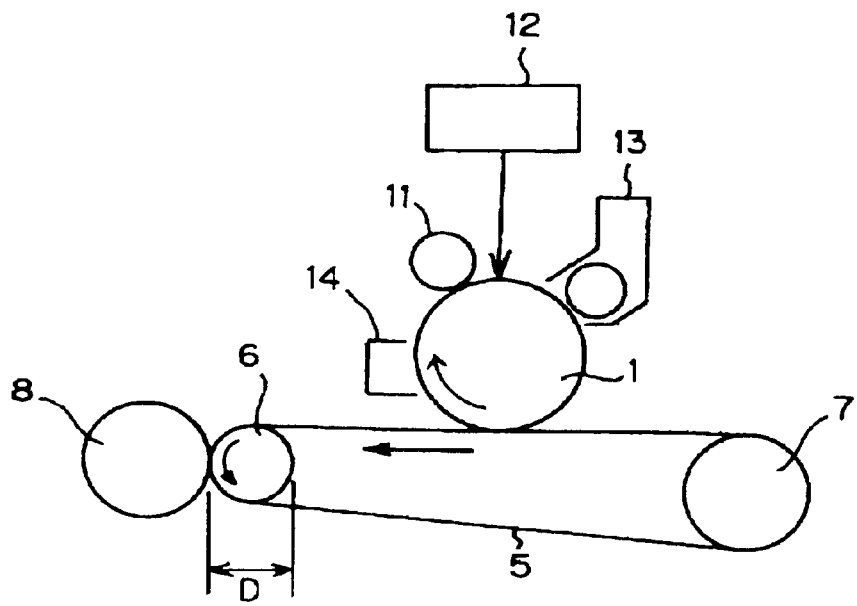
FIG. 1 is a cross section illustrating a schematic constitution of an image forming apparatus practiced as one preferred embodiment of the present invention.

In the image forming apparatus shown in FIG. 1, a transfer bet 5 is wound around a drive roll 6 and a follower roll 7. This transfer belt 5 is equivalent to an example of a toner supporter for use in the image forming apparatus of the present invention and also to an example of a sheet carrier for use in the sheet carrying apparatus of the present invention. This holds the same with the preferred embodiments of the invention to be described later.

Figure 21:
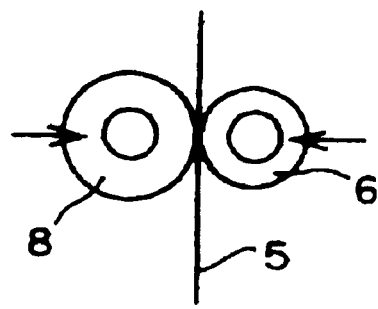
FIGS. 21(A) and 21(B) are cross section and a plan respectively illustrating a method of mechanical pressing in the conventional image forming apparatus.
Figure 21:
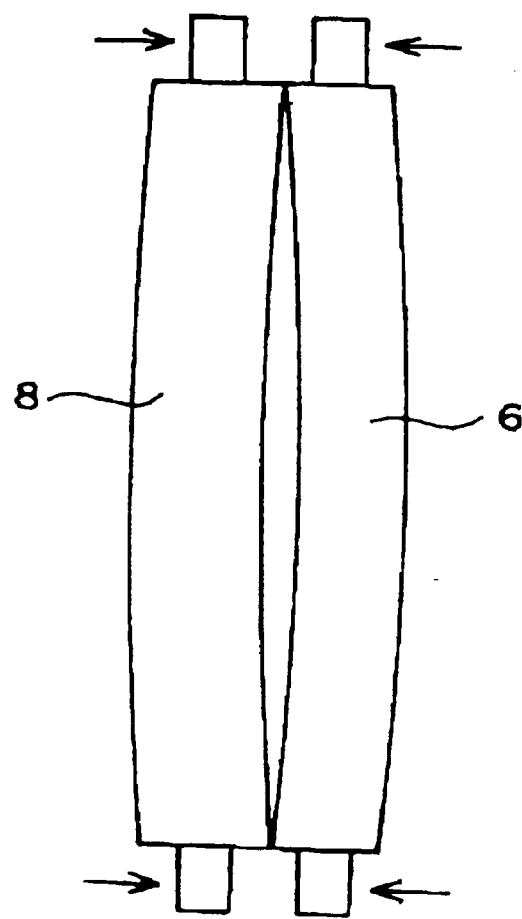
Figure 22:
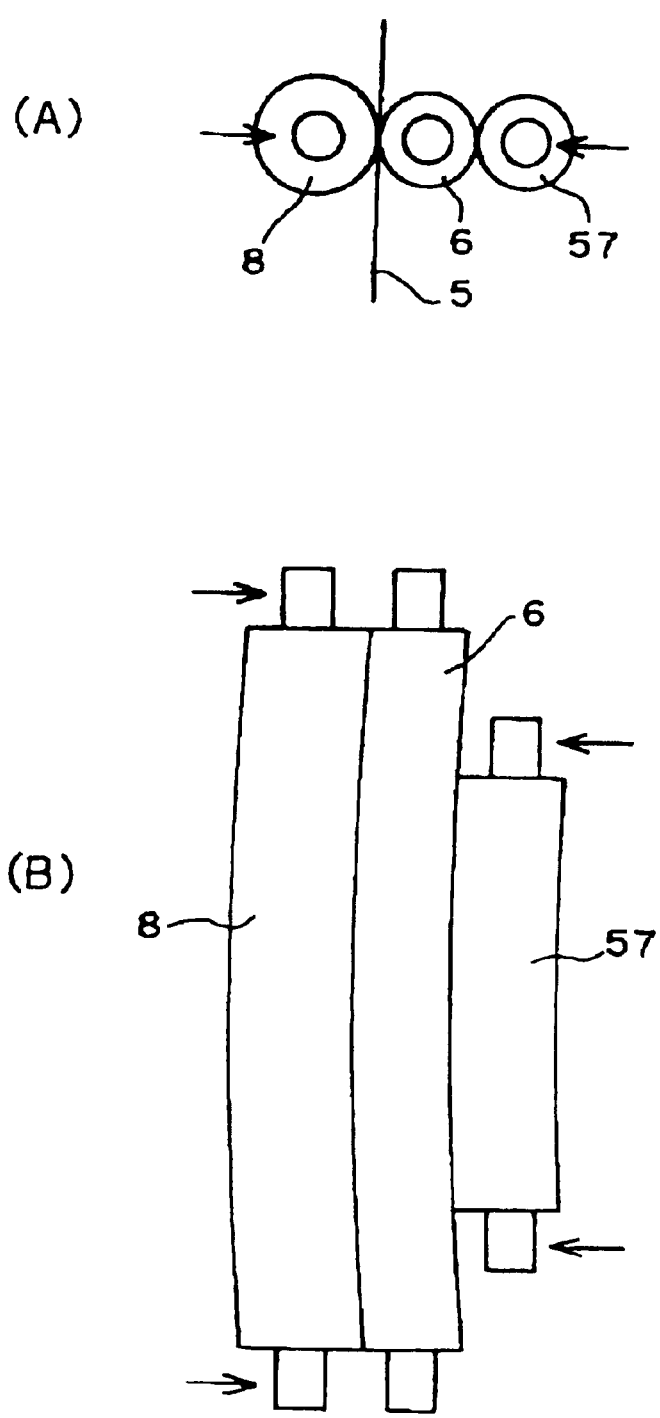
FIGs. 22(A) and 22(B) are cross section and a plan respectively illustrating another method of mechanical pressing in the convention image forming apparatus.

Preferably, the drive roll 6 is provided on the surface thereof with a layer made of a material having a high frictional coefficient so that a high frictional force is obtained between the drive roller 6 and a transfer belt 5. For example, it is desirable to provide a rubber layer having appropriate thickness and hardness that do not lower mechanical accuracy, thereby mitigating the damage to the transfer belt 5 due to the pressing load. An opposing member 8 is arranged opposite to the drive roll 6 with the transfer belt 5 in between. In FIG. 1, the opposing member is a follower roll serving as a pinch roll. Between this pinch roll and the drive roll 6, magnetic attraction works to press each other, pressing the pinched transfer belt 5 against the drive roll 6. To effect the magnetic attraction, both the drive roll 6 and the opposing member 8 are made of a magnetic material for example and a magnet is arranged in the proximity of at least one of these components in order to make magnetic field extend both these components or a magnet is arranged inside at least one of these components and the other component is made of a magnetic material. This magnet may be an electromagnet; generally, however, a permanent magnet can be used. Use of the magnetic attraction by a magnet is simple in construction and low in cost. Preferably, however, the magnet is arranged on the side of the opposing member. This is because, in the image forming apparatus according to the present invention, the opposing member has a comparatively high degree of freedom in working and function to allow a magnet to be assembled on the opposing member, while the drive roll is required to increase external accuracy of diametral dimension, eccentricity, and out-of-roundness and have work processes such as coating to increase surface frictional coefficient. As described, the drive roll 6 is attracted to the follower roll by a force other than the mechanical forces shown in FIGS. 21 and 22 and therefore is not exposed to any external pressing forces. Therefore, the drive roll 6 is applied with a generally uniform pressing force along its entire length. As a result, a uniform frictional force is generated between the drive roll surface and the transfer belt, thereby carrying the transfer belt by a high drive force and with reliability. In addition, since the drive force is derived not from belt tension or a frictional force generated by belt winding but from the magnetic attraction with the opposing member. Therefore, basically, the transfer belt is pulled only from the downstream as viewed from the transfer section touching the photosensitive drum 1. Consequently, directionality of the transfer belt is defined by alignment of the drive roll and therefore is not affected by transfer belt mechanical accuracy (conicity) and guide members such as the follower roll, resulting in stable directionality and little skew at right angles to carrying direction. Further, the drive roll and the follower roll magnetically attract each other to resist the belt tension in tensile direction. Therefore, the secondary moment of area in the tensile direction increases more than the level obtained by simply adding each secondary moment of area, thereby causing no deflection even if the diameter of the drive roll is small. Because no deflection is caused, no uniform tension is applied to the belt and therefore no waving and wrinkles are caused, thereby causing no poor transfer due to poor contact between the photosensitive drum 1 and the transfer belt 5. For a means for providing a nonmechanical and uniform attractive force other than the magnetic means, an electrostatic means is conceivable. In the electrostatic means, different voltages are applied to the drive roll and the opposing member to cause a potential difference between them or one of them is supplied with a voltage while the other is grounded for example. However, in order to dominantly drive the transfer belt by overcoming the electrostatic force applied to the transfer belt, the frictional force for cleaning, and an impact caused by paper supply for example, a large potential difference is required. This causes problems that insulation layers provided on the surfaces of the drive roll, the opposing member, or the transfer belt cannot withstand high voltages or that a normal handling safety area is exceeded, thereby making the electrostatic means impractical.

In an image forming apparatus shown in FIG. 1, the pinch roll 8 is larger than the drive roll 6 in diameter. In order to achieve further reduction in the size of the apparatus, the pinch roll 8 may be reduced in diameter, generally as small as that of the drive roll 6. Also in the image forming apparatus shown in FIG. 1, the follower roll 7 is larger in diameter than the drive roll 6. The follower roll 7 may be reduced in diameter generally to that of the drive roll 6. Based on this, a pinch roll may be arranged at a position with the transfer belt 5 pinched between this pinch roll and the follower roll 7. It may be constituted in this arrangement that magnetic attraction works between this pinch roll and the follower roll 7.

Preferably, the transfer belt has a slack section in which the transfer belt slacks, at least at a part of an area other than an area contributing to supporting a toner image. The following describes an preferred embodiment having this slack section.

Figure 2:
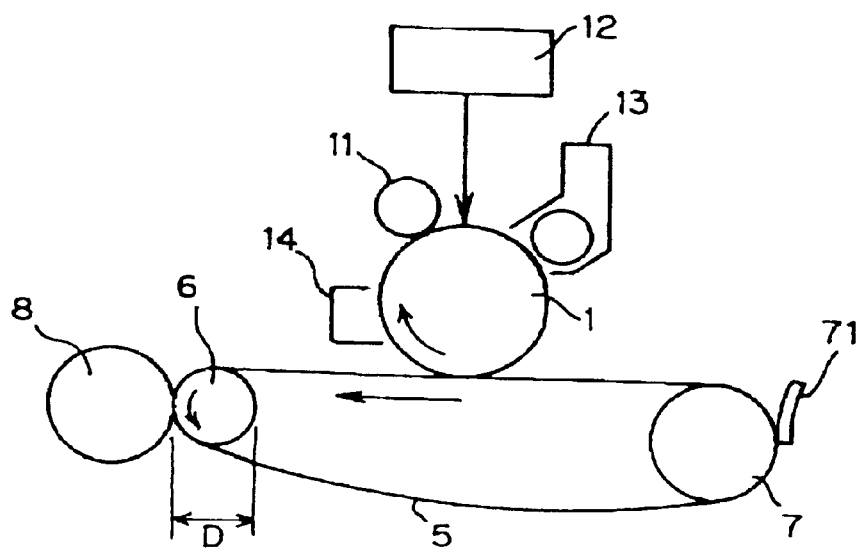
FIG. 2 is a cross section illustrating a schematic constitution of an image forming apparatus practiced as another preferred embodiment of the present invention.

In an image forming apparatus shown in FIG. 2, a slack section in which no tension works is provided at a part of the transfer belt carrying path. For a means for generating a braking force necessary for produce this slack section, a blade 71 is arranged to impart the braking force caused by friction. As disclosed in Japanese Published Unexamined Patent Application Sho 54-24033, it has been known that arranging of an area in which no tension works on the belt provides advantages such as requiring no belt mechanical accuracy and therefore enhancing belt durability and facilitating belt offset adjustment. The belt offset includes meandering in which the belt position along its width oscillates with time and skew in which the belt is stuck to one side in its width direction. The offset herein mainly denotes skew. In the image forming apparatus according to the present invention, the drive force is not derived from the frictional force caused by belt tension and belt winding force but from the magnetic attraction between the drive roll and the opposing member. Therefore, the driving force is highly stable, thereby facilitating provision of the slack section in which no tension works as shown in FIG. 2.

When this slack section is provided, an offset correcting means for correcting the offset of the transfer belt in its width direction is arranged on this slack section, in which the offset of the transfer belt is corrected.

Figure 3:
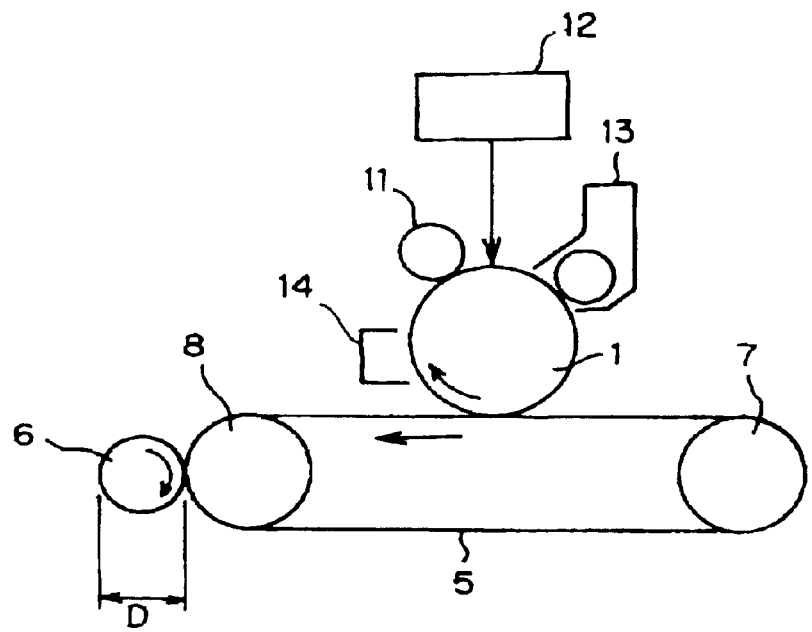
FIG. 3 is a cross section illustrating a schematic constitution of an image forming apparatus practiced as still another preferred embodiment of the present invention.

In an image forming apparatus shown in FIG. 3, the transfer belt 5 is wound around two follower rolls 7 and 8 having a relatively large diameter so that the tension of the transfer belt will not act on the drive roll 6. The drive roll 6 is opposed to the pinch roll 8, one of the follower rolls, from the external circumference, thereby attracting each other. Because no external pressing force is applied to the drive roll 6 and the pinch roll 8, a generally uniform pressing force is applied to these rolls along the entire length thereof. The drive roll 6 can withstand, together with the follower rolls having a relatively large secondary moment of area, the tension of the transfer belt 5, causing no slack even if the drive roll 6 is small in diameter. If the drive roll is not wound with the transfer belt 5 but contact is made at a small contact area from the outside, a uniform and large pressing force can be axially applied by magnetic attraction, thereby providing a stable and large driving force. However, a positional relationship between the transfer belt 8 and the photosensitive drum 1 is also periodically affected by rotation of the pinch roll 8, one of the follower rolls. This requires the pinch roll 8 to be accurately finished in its cylindricality and eccentricity.

Figure 4:
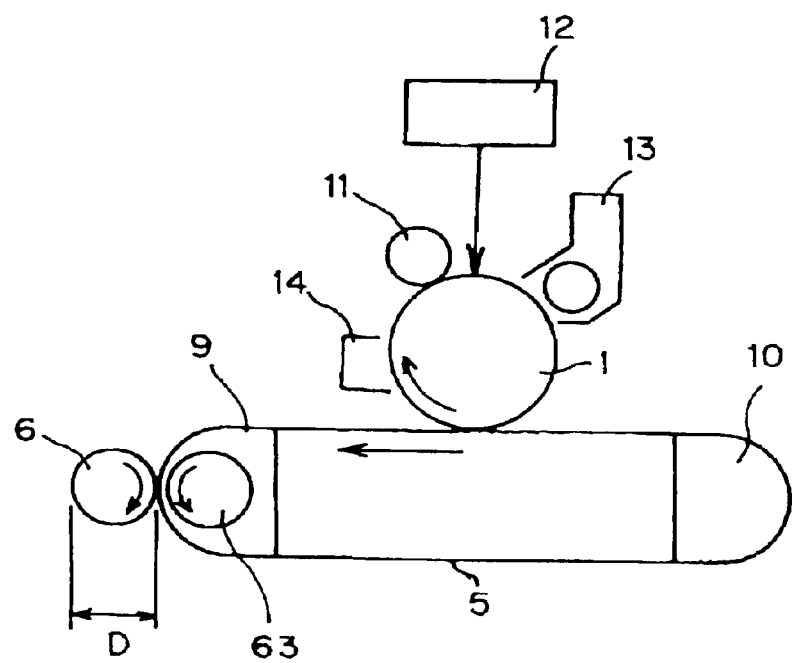
FIG. 4 is a cross section illustrating a schematic constitution of an image forming apparatus practiced as yet another preferred embodiment of the present invention.

An image forming apparatus shown in FIG. 4 is a preferred embodiment of the invention in which the transfer belt 5 is wound around two fixed guide beams 9 and 10 extending along the width of the transfer belt 5, thereby eliminating the effects of the eccentricity and poor cylindricality of the pinch roll and follower roll in the image forming apparatus shown in FIG. 3. The fixed guide beam 9 has a free rotating roll 63 constituting a magnetic force imparting means inside the fixed guide beam 9, namely on the rear side of the transfer belt 5. The drive roll 6 and the opposing fixed guide beam 9 press each other with the transfer belt in between. In this preferred embodiment, the tension imparting capability of the transfer belt 5 is separated from the driving capability thereof and the two guide beams 9 and 10, tension imparting members, are fixed. This constitution prevents the support of the entire transfer belt from being shaky, thereby allowing the rotary drive speed of the drive roll 6 to be transmitted with reliability as the carrying speed of the transfer belt. Unlike the follower roll, which is the conventional belt tension imparting member, this preferred embodiment has the fixed guide beam, so that no force acts on the transfer belt in operation in the direction at right angles to the carrying direction and therefore the offset in the direction at right angles to the belt carrying direction is not caused, thereby allowing the transfer belt to faithfully trace the direction in which the drive roll carries the belt. Although it is desirable for the surface of the drive roll to be formed by a material of high frictional coefficient as described before, it is desirable for the surface of the fixed guide beam, especially the surface of the guide beam 9 on the side opposed to the drive roll and on which magnetic attraction acts, to be formed by a material having low frictional coefficient so that belt carrying by the drive roll is not hampered. Generally available for such a material having low frictional coefficient are stainless steel having polished surface, aluminum oxide having polished surface, aluminum oxide coated with fluoroplastics, and plastic having injection-molded surface, for example.

Figure 5:
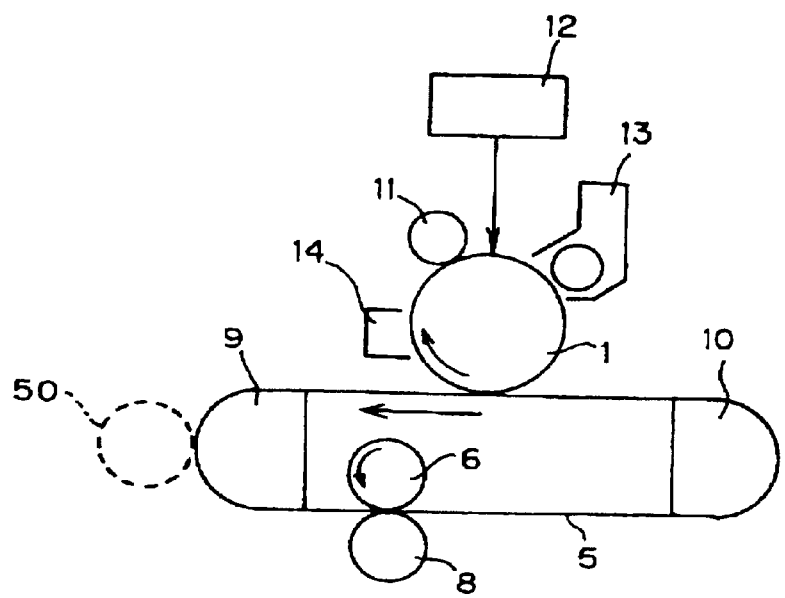
FIG. 5 is a cross section illustrating a schematic constitution of an image forming apparatus practiced as a further preferred embodiment of the present invention.

In an image forming apparatus shown in FIG. 5, the transfer belt 5 is also wound around the fixed guide beams 9 and 10. Unlike the image forming apparatus shown in FIG. 4, the drive roll 6 is opposed to the pinch roll 8 at a position different from the fixed guide beam, thereby allowing the drive roll and pinch roll to attract each other. In the image forming apparatus shown in FIG. 4, in addition to the tension of the transfer belt, the attracting force of the drive roll 6 is applied to the fixed guide beam 9, thereby making it possible to cause an unnecessary frictional force between the back side of the transfer belt and the surface of the fixed guide beam. In the image forming apparatus shown in FIG. 5, no attracting force is applied to the fixed guide beam, reducing the frictional force. The belt tension is applied to the drive roll 6 in the direction opposite to the belt carrying direction. Since the drive roll 6 and the pinch roll 8 attract each other to withstand this belt tension, preventing both the rolls from being deflected by the belt tension. In this case, however, both the rolls are integrated in the direction at right angles to the tension application direction, so that the secondary moment of area is generally equivalent to a total of both. If the transfer belt 5 is used as an intermediate transfer member in the image forming apparatus shown in FIG. 5, a secondary transfer means 50 may be arranged at the position of the fixed guide beam 9 for example to transfer the toner image on this intermediate transfer member onto another transferred paper (a toner image transferred sheet herein).

The fixed guide beams 9 and 10 of the image forming apparatuses shown in FIGS. 4 and 5 have a construction in which two semi-cylinders are coupled together with side plates as shown in the side view of FIG. 6(A) and the perspective view of FIG. 6(B). However, the construction of the fixed guide beams is not limited to the construction mentioned above. Namely, the fixed guide beams may also be cylindrical as shown in the side views of FIGS. 7(A) and 8(A) and the perspective views of FIGS. 8(A) and 8(B). Basically, any construction in which the two fixed guide beams are fixed generally in parallel to each other may be used. Skewing of the transfer belt depends not on the parallelism of the two fixed guide beams but on the positional relationship between the drive roll 6 and the photosensitive drum 1, so that the mechanical accuracy of the fixed guide beams need not be so high. The number of fixed guide beams is not necessarily two; it may be one or three.

In the above-mentioned image forming apparatuses, while a high contact force is provided between the drive roll and the transfer belt, leaving the drive roll and the transfer belt at rest for long forms a permanent distortion on the transfer belt generally made of a resin material in the thickness direction thereof, possibly hampering the carrying performance thereafter. If a rubber layer is provided on the surface of the drive roll for imparting a high frictional force, the same trouble as mentioned above occurs on this rubber layer. To circumvent this problem, the drive roll and the opposing member are detachably arranged from each other, in which a separating means is provided for separating the drive roll from the opposing member when the drive roll is at rest, namely the image forming apparatus is not operating. When the drive roll starts operating, the separating means is disabled to allow the magnetic attraction to act between the drive roll and the opposing member. In this case, an offset correcting means is preferably provided for correcting the offset of the transfer belt along the width thereof. This offset correcting means is operated when the drive roll and the opposing member are separated from each other.

The following describes a preferred embodiment of a color image forming apparatus having a plurality of image forming units arranged at predetermined intervals along the travel path of the transfer belt each for forming, as a toner image forming means, a toner image of each color such that a total color toner image onto the transfer belt or a transfer paper supported by the same. In this color image forming apparatus, as described with reference to FIG. 18, outer perimeter length πD (D being the diameter of the drive roll) of the drive roll is set to a value equal to the above-mentioned interval times one divided by an integer (1/integer), namely L=n πD, where L is the above-mentioned predetermined interval and n is an integer. Each of the image forming unit is composed of a photosensitive drum, and a charging device and a developing device arranged around the photosensitive drum.

Figure 9:
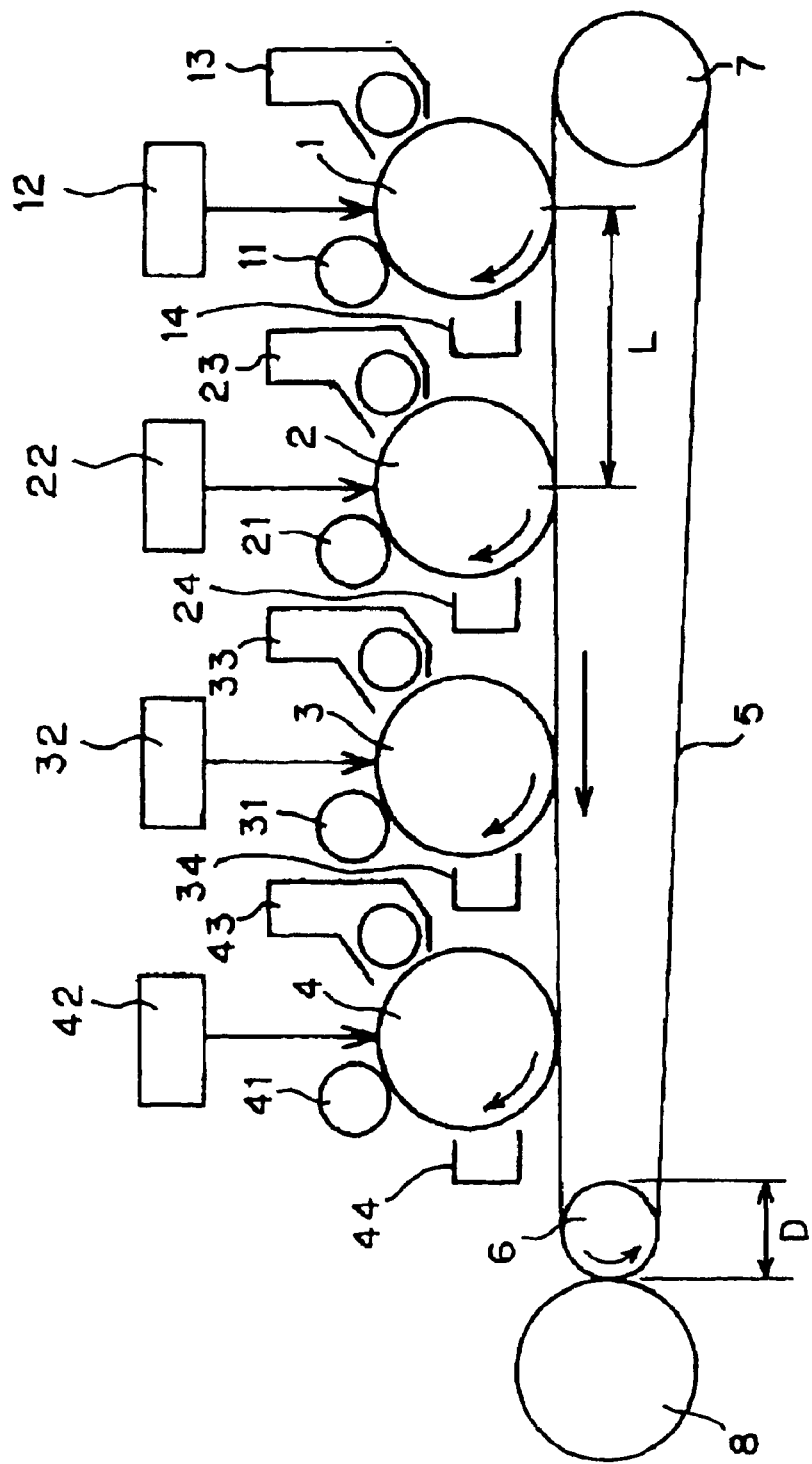
FIG. 9 is a cross section illustrating a schematic constitution of an image forming apparatus practiced as a still further preferred embodiment of the present invention.

In an image forming apparatus shown in FIG. 9, the transfer belt 5 is wound around the drive roll 6 and the follower roll 7. Diameter D of the drive roll and distance L between the transfer positions of adjacent photosensitive drums are in a relationship L=πD. In this relationship, the phases of the transfer speeds of the color toner images formed on the photosensitive drums 1, 2, 3, and 4 by one rotation of the drive roll match each other, preventing color offset from occurring. The surface of the drive roll 6 is preferably provided with a layer of a material having a high frictional coefficient so that a high frictional force is imparted between the drive roll 6 and the transfer belt 5. For example, a rubber layer having thickness and hardness of an appropriate level not lowering mechanical accuracy of the drive roll is preferable in mitigating the damage by pressing load onto the transfer belt. Opposite to the drive roll 6, the opposing member 8 is arranged with the transfer belt in between. In FIG. 9, the opposing member is a follower roll. Magnetic attraction acts between the drive roll 6 and the opposing member 8, so that the opposing member provides a pinch roll that presses the transfer belt against the drive roll 6. To effect the magnetic attraction, both the drive roll 6 and the opposing member 8 are made of magnetic substance and a magnet is arranged in the vicinity of at least one of the drive roll and the opposing member or a magnetic is arranged inside at least one of the drive roll and the opposing member. This magnet may be an electromagnet; generally, however, a permanent magnet can be used. Use of the magnetic attraction by a magnet is simple in construction and low in cost. Preferably, however, the magnet is arranged on the side of the opposing member. This is because, in the image forming apparatus according to the present invention, the opposing member has a comparatively high degree of freedom in working and function to allow a magnet to be assembled on the opposing member, while the drive roll is required to increase external accuracy of diametral dimension, eccentricity, and out-of-roundness and have work processes such as coating to increase surface frictional coefficient. As described, the drive roll 6 is attracted to the follower roll by a force other than the mechanical forces shown in FIGS. 21 and 22 and therefore is not exposed to any external pressing forces. Therefore, the drive roll 6 is applied with a generally uniform pressing force along its entire length. As a result, a uniform frictional force is generated between the drive roll surface and the transfer belt, thereby carrying the transfer belt by a high drive force and with reliability. In addition, since the drive force is derived not from belt tension or a frictional force generated by belt winding but from the magnetic attraction with the opposing member, basically, the transfer belt 5 is pulled only from the downstream as viewed from the transfer section touching the photosensitive drum 4. Consequently, directionality of the transfer belt is defined by alignment of the drive roll and therefore is not affected by transfer belt mechanical accuracy (conicity) and guide members such as the follower roll, resulting in stable directionality and little skew at right angles to carrying direction. Further, the drive roll and the follower roll magnetically attract each other to resist the belt tension in tensile direction. Therefore, the secondary moment of area in the tensile direction increases more than the level obtained by simply adding each secondary moment of area, thereby causing no deflection even if the diameter of the drive roll is small. Consequently, the drive roll having small diameter D=L/π can be used effectively so that the phases of the colors match each other if the interval L between the photosensitive drums is small. In addition, since no uneven tension is applied to the transfer belt and therefore no such troubles as waving and wrinkle occur, no poor transfer due to poor contact between the photosensitive drums 1, 2, 3, and 4 and the transfer belt 5 occurs.

Figure 10:
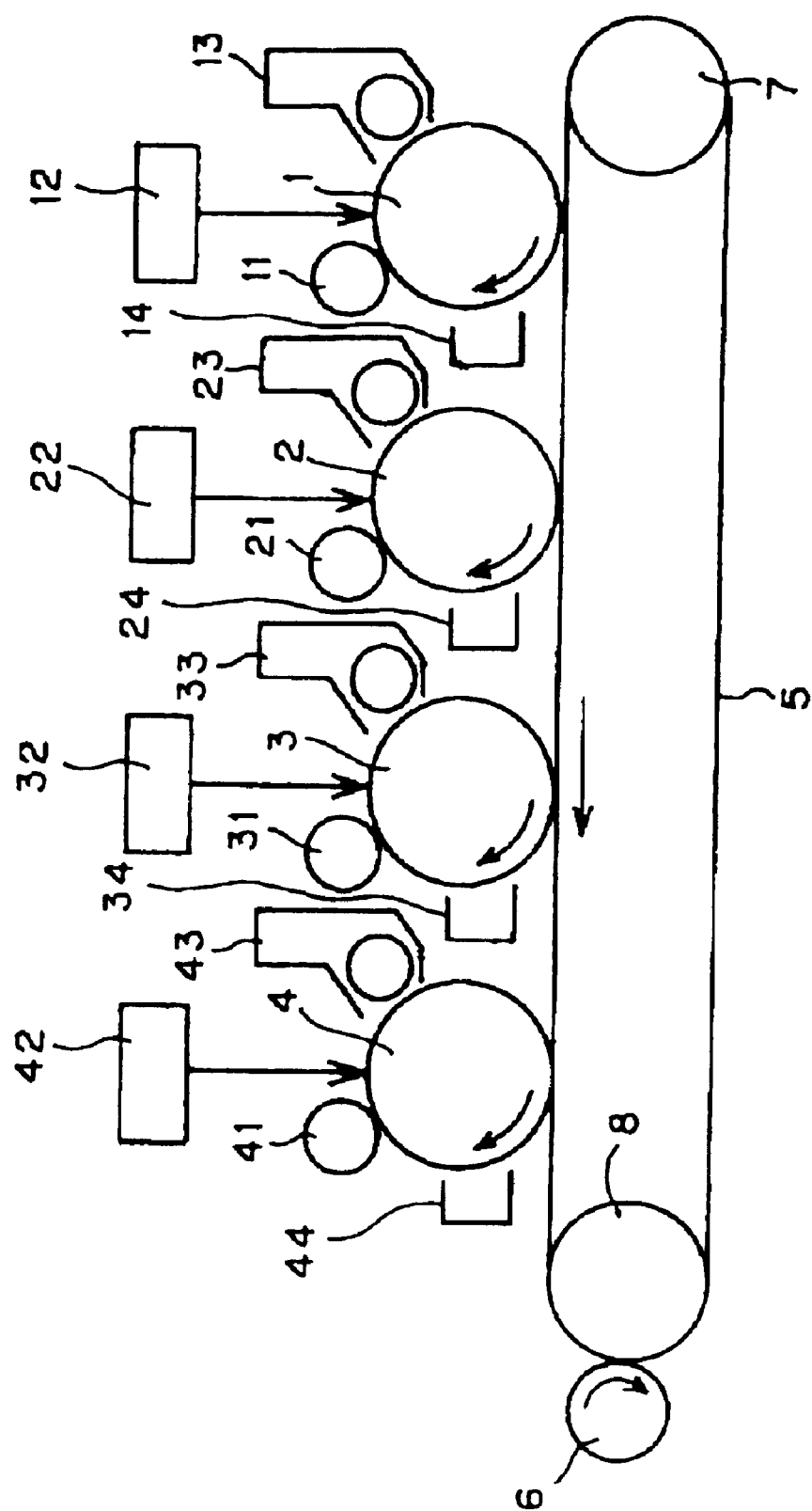
FIG. 10 is a cross section illustrating a schematic constitution of an image forming apparatus practiced as yet further preferred embodiment of the present invention.

In an image forming apparatus shown in FIG. 10, the transfer belt 5 is wound around the two follower rolls 7 and 8 having a comparatively large diameter, so that the tension of the transfer belt 5 does not act on the drive roll 6. The drive roll 6 is opposed to the pinch roll 8, one of the follower rolls, from the outer circumference side of the transfer belt 5, being attracted to the pinch roll. If the drive roll 6 is not wound with the transfer belt 5 but contact is made at a small contact area from the outside, a uniform and large pressing force can be axially applied by magnetic attraction. Because no external pressing force is applied to the drive roll 6 and the pinch roll 8, a generally uniform pressing force is applied to these rolls along the entire length thereof. In FIG. 10, diameter D of the drive roll and the distance L between the transfer positions of the adjacent photosensitive drums are also in the relationship of L=πD. Because the drive roll 6 can withstand, together with the follower roll 8 having a relatively large secondary moment of area, the tension of the transfer belt 5, causing no slack even if the drive roll 6 is small in diameter, the phases of the images of the colors match well with each other, causing no color offset. However, a positional relationship between the transfer belt 8 and the photosensitive drum 1 is also periodically affected by rotation of the pinch roll 8, one of the follower rolls. This requires the pinch roll 8 to be accurately finished in its cylindricality and eccentricity.

Figure 11:
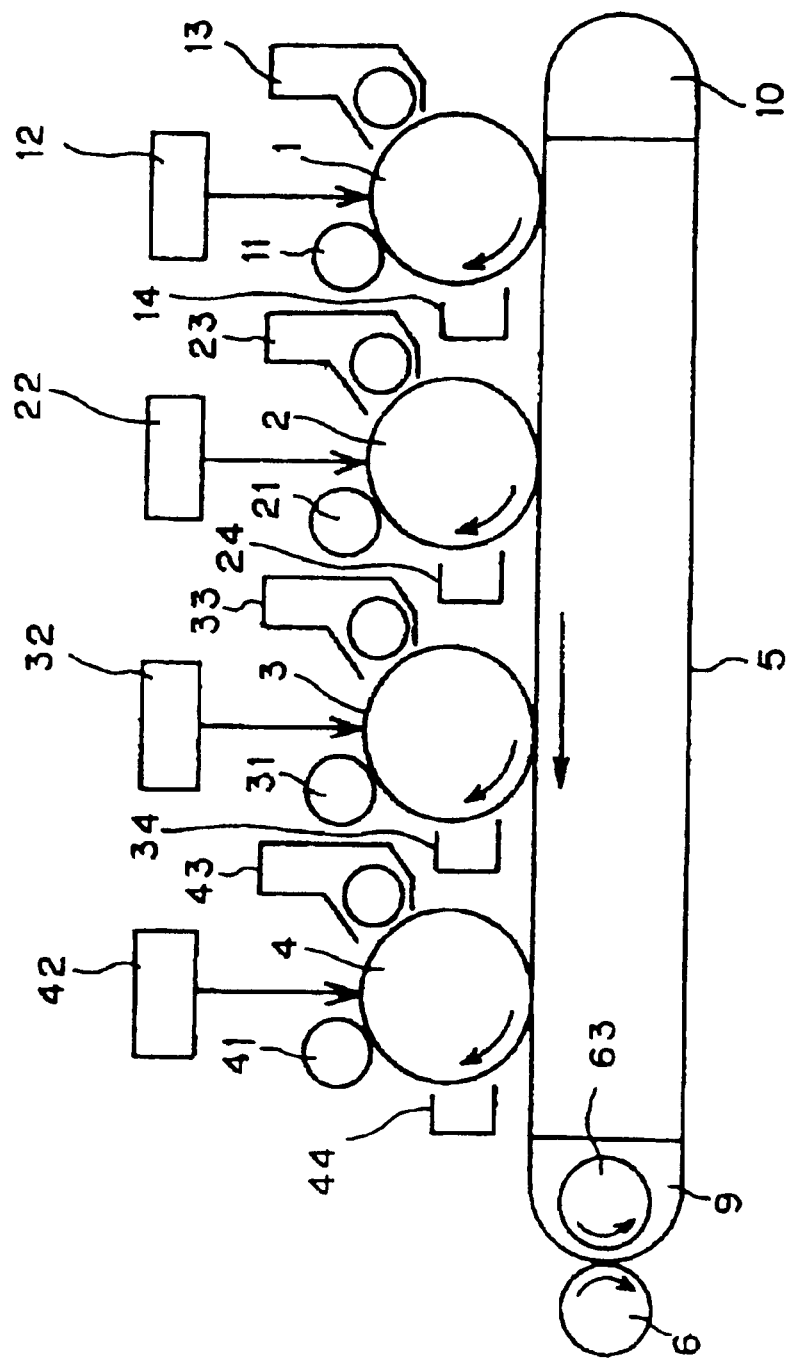
FIG. 11 is a cross section illustrating a schematic constitution of an image forming apparatus practiced as a different preferred embodiment of the present invention.

In an image forming apparatus shown in FIG. 11, the transfer belt 5 is wound around two fixed guide beams 9 and 10, thereby eliminating the effects of the eccentricity and poor cylindricality of the pinch roll and the follower roll found in the image forming apparatus of FIG. 10. The fixed guide beam 9 has a free rotating roll 63 constituting a magnetic force imparting means inside the fixed guide beam 9. The drive roll 6 and the opposing fixed guide beam 9 press each other with the transfer belt 5 in between. In this preferred embodiment, the tension imparting capability of the transfer belt 5 is separated from the driving capability of thereof and the two guide beams 9 and 10, tension imparting members, are fixed. This constitution prevents the support of the entire transfer belt from being shaky, thereby allowing the rotary drive speed of the drive roll 6 to be transmitted with reliability as the carrying speed of the transfer belt 5. Unlike the follower roll, which is the conventional belt tension imparting member, this preferred embodiment has the fixed guide beam, so that no force acts on the transfer belt in operation in the direction at right angles to the carrying direction and therefore the offset in the direction at right angles to the belt carrying direction is not caused, thereby allowing the transfer belt to faithfully trace the direction in which the drive roll carries the belt. Although it is desirable for the surface of the drive roll to be formed by a material of high frictional coefficient as described before, it is desirable for the surface of the fixed guide beam, especially the surface of the guide beam 9 on the side opposed to the drive roll and on which magnetic attraction acts, to be formed by a material having low frictional coefficient so that belt carrying by the drive roll is not hampered. Generally available for such a material having low frictional coefficient are stainless steel having polished surface, aluminum oxide having polished surface, aluminum oxide coated with fluoroplastics, and plastic having injection-molded surface, for example.

Figure 12:
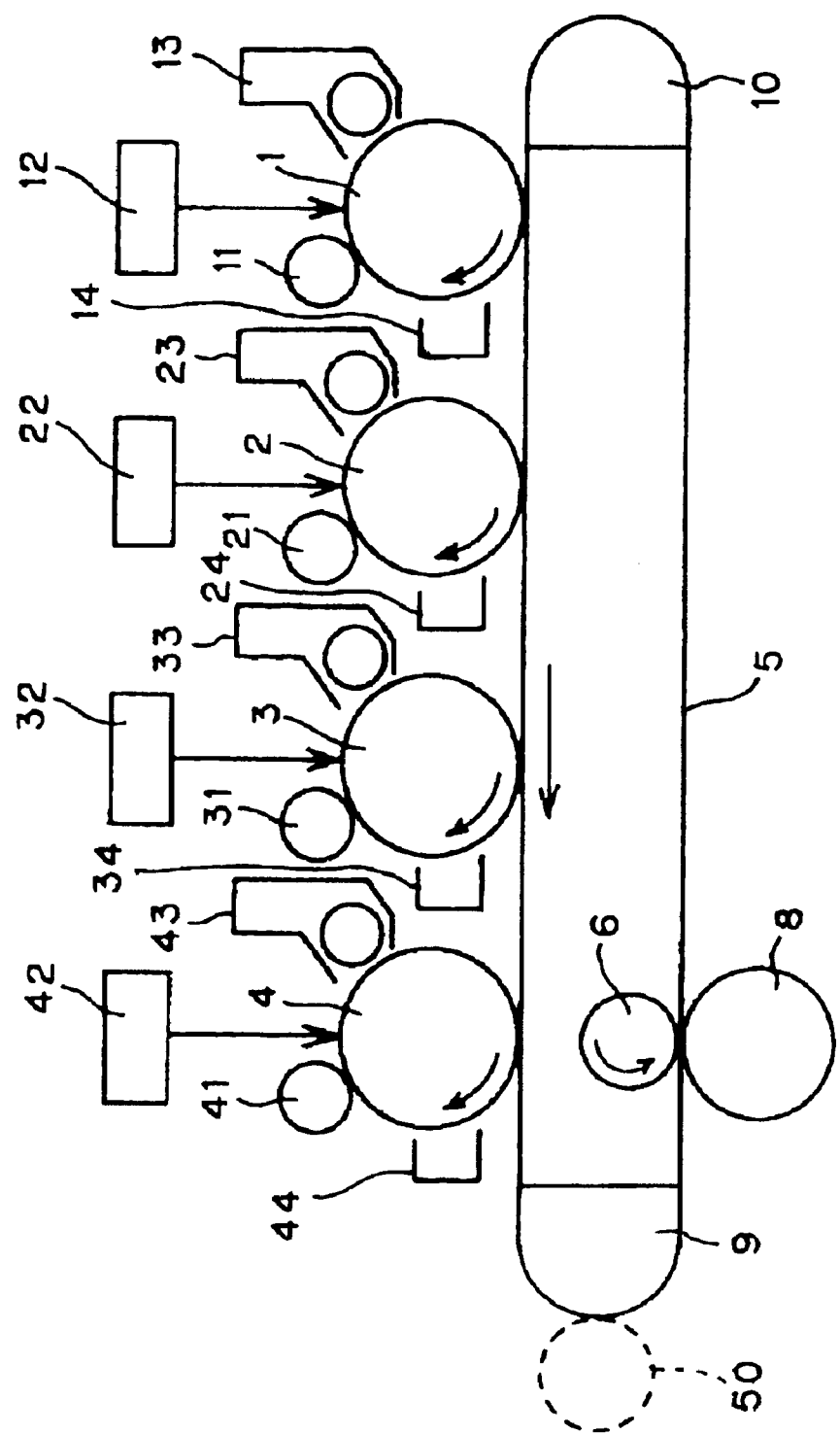
FIG. 12 is a cross section illustrating a schematic constitution of an image forming apparatus practiced as a still different preferred embodiment of the present invention.

In an image forming apparatus shown in FIG. 12, the transfer belt 5 is also wound around the two fixed guide beams 9 and 10. However, unlike the image forming apparatus shown in FIG. 11, the drive roll 6 is opposed to the pinch roll 8 at a position different from the fixed guide beam, thereby allowing the drive roll and pinch roll to attract each other. In the image forming apparatus shown in FIG. 11, in addition to the tension of the transfer belts 5, the attracting force of the drive roll 6 is applied to the fixed guide beam 9, thereby making it possible to cause an unnecessary frictional force between the back side of the transfer belt and the surface of the fixed guide beam. In the image forming apparatus shown in FIG. 12, no attracting force is applied to the fixed guide beam, reducing the frictional force. The belt tension is applied from the transfer belt 5 to the drive roll 6 in the direction opposite to the belt carrying direction. Since the drive roll 6 and the pinch roll 8 attract each other to withstand this belt tension, they are not deflected by the belt tension. In this case, however, both the rolls are integrated in the direction at right angles to the tension application direction, so that the secondary moment of area is generally equivalent to a total of both. If the transfer belt 5 is used as an intermediate transfer member in the image forming apparatus shown in FIG. 12, a secondary transfer means 50 may be arranged at the position of the fixed guide beam 9, for example, to transfer the toner image on this intermediate transfer member onto another transferred paper.

Figure 13:
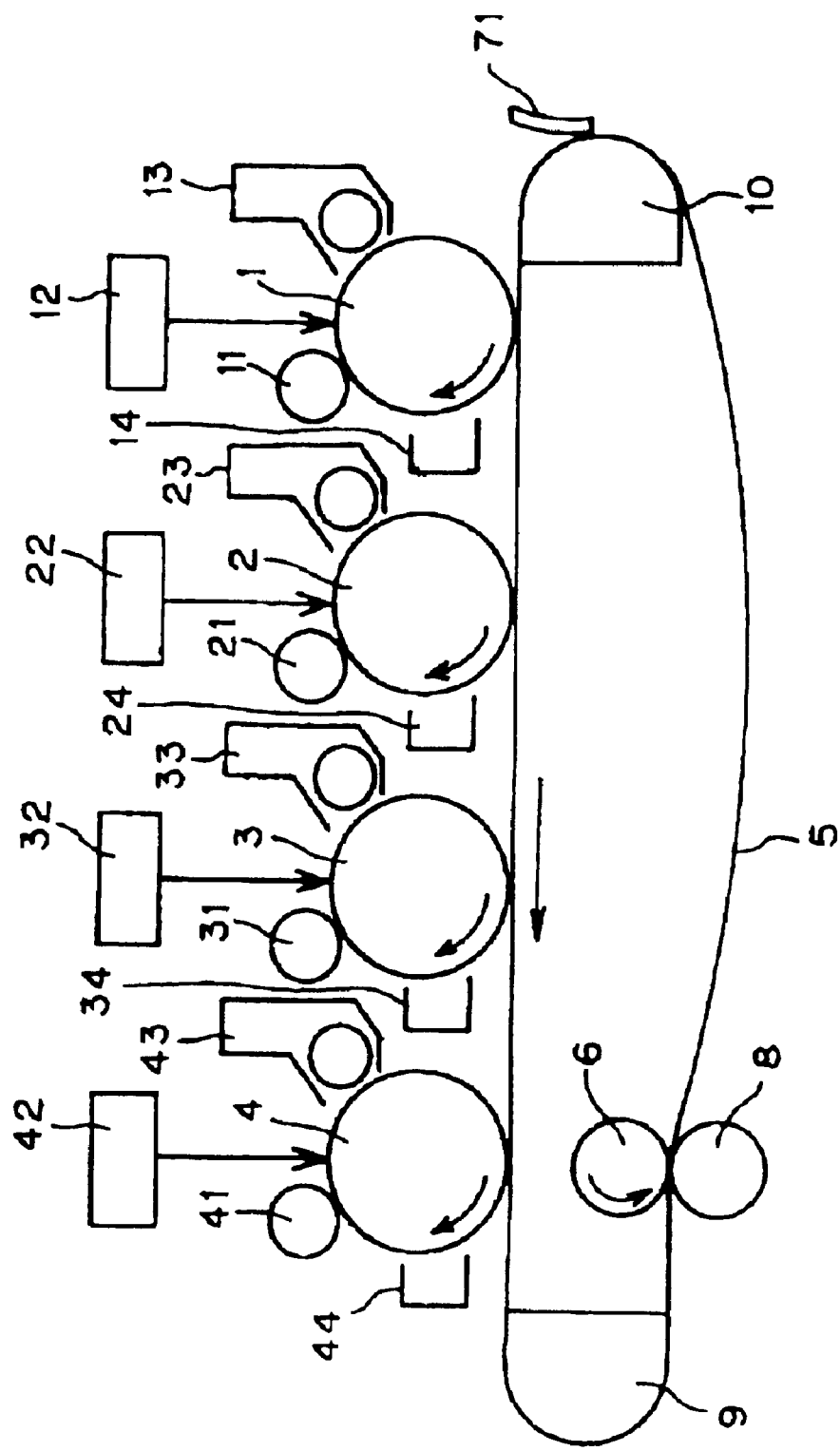
FIG. 13 is a cross section illustrating a schematic constitution of an image forming apparatus practiced as a yet different preferred embodiment of the present invention.

In an image forming apparatus shown in FIG. 13, a slack section in which no tension works is provided at a part of the transfer belt carrying path of the image forming apparatus shown in FIG. 12. As disclosed in Japanese Published Unexamined Patent Application Sho 54-24033, it has been known that arranging of an area in which no tension works on the belt provides advantages such as requiring no belt mechanical accuracy and therefore enhancing belt durability and facilitating belt offset adjustment. The offset herein mainly denotes skew as describe before. In the image forming apparatus according to the present invention, the drive force is not derived from the frictional force caused by belt tension and belt winding force but from the magnetic attraction between the drive roll and the opposing member. Therefore, the driving force is highly stable, thereby facilitating provision of the slack section in which no tension works as shown in FIG. 13. In addition, the frictional force between the fixed guide beam 10 and the transfer belt 5 acts a braking force necessary for providing the slack section in which no tension works, so that a brake roller pair as disclosed in Japanese Published Unexamined Patent Application Sho 54-24033 need not always be provided. To increase the braking force due to frictional force, the blade 70 as shown in FIG. 13 may be provided or the transfer belt may be pressed by the pinch roll against the fixed guide beam 10. Thus, if a transfer belt restraint mechanism like a braking force generating device is provided in the downstream of the slack section in which no tension works, the transfer belt need not always be an endless belt; it may be a long ended belt, which also ensures stable carrying operation.

Figure 14:
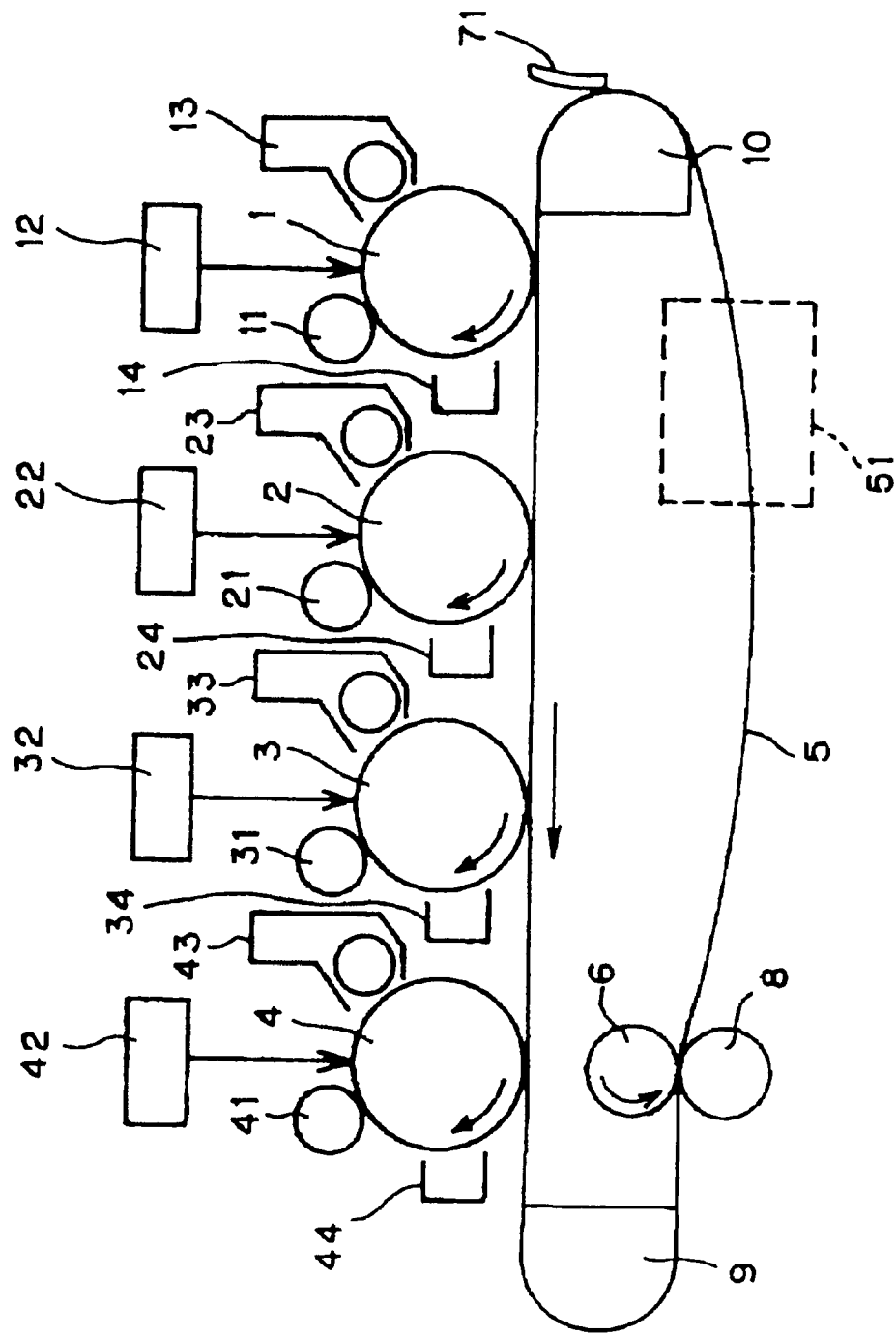
FIG. 14 is a cross section illustrating a schematic constitution of an image forming apparatus practiced as a separate preferred embodiment of the present invention.

In an image forming apparatus shown in FIG. 14, an offset correcting device 51 like one disclosed in Japanese Published Unexamined Patent Application Sho 54-24033 is arranged in a slack section in which no tension works, especially in the vicinity of a position at which braking force is generated in the slack section shown in FIG. 13 in which tension does not act. This belt offset correcting device is constituted by a guide plate fixed abutting the belt end surface, a collar-shaped guide plate fixed onto the roll, one of these guide plates which is supported elastically without fixing, a guide plate in which belt offset is detected and guide plate position is automatically controlled, or a steering roll abutting the belt at generally right angles to its travel direction in which steering roll angle is automatically controlled.

Figure 6:
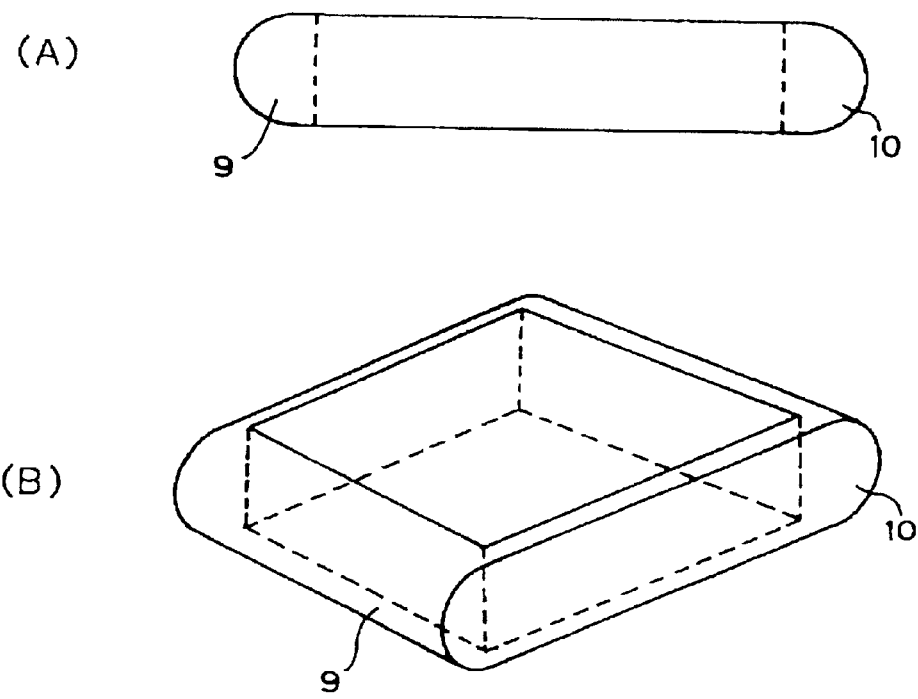
FIG. 6(A) and FIG. 6(B) are a cross section and a perspective view respectively illustrating a schematic constitution of a fixed guide beam member for use in the image forming apparatus according to the present invention.
Figure 7:
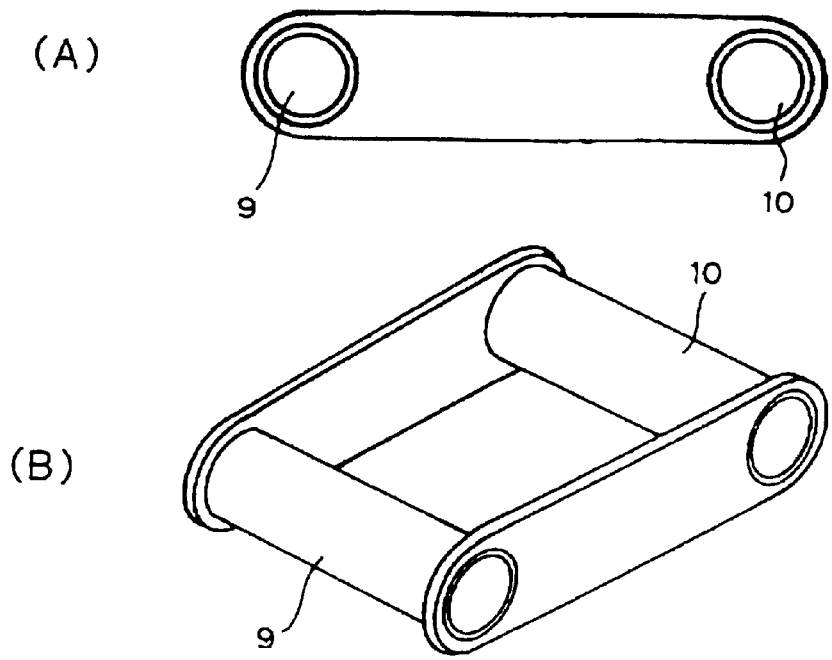
FIG. 7(A) and FIG. 7(B) are a cross section and a perspective view respectively illustrating another schematic constitution of the fixed guide beam member for use in the image forming apparatus according to the present invention.
Figure 8:
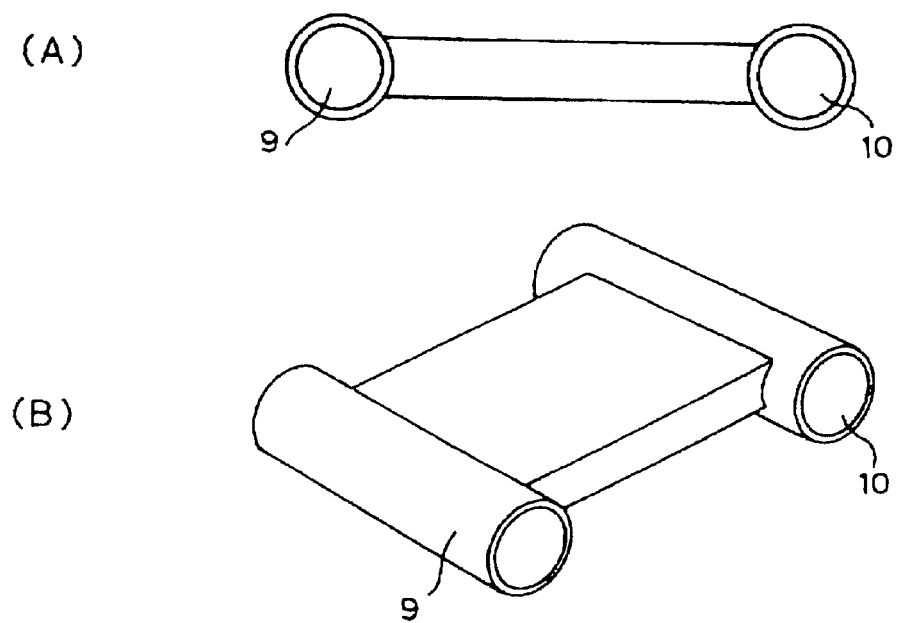
FIG. 8(A) and FIG. 8(B) are a cross section and a perspective view respectively illustrating still another schematic constitution of the fixed guide beam member for use in the image forming apparatus according to the present invention.

For the fixed guide beams 9 and 10 used in the image forming apparatuses shown in FIGS. 11 through 14, those having the constructions shown in FIGS. 6 through 8 can be used.

In the above-mentioned color image forming apparatuses, like the above-mentioned monochromatic image forming apparatuses, while a high contact force is provided between the drive roll and the transfer belt, leaving the drive roll and the transfer belt at rest for long forms a permanent distortion on the transfer belt generally made of a resin material in the thickness direction thereof, possibly hampering the carrying performance thereafter. If a rubber layer is provided on the surface of the drive roll for imparting a high frictional force, the same trouble as mentioned above occurs on this rubber layer. To circumvent this problem, a separating means is provided for separating the drive roll from the opposing member when the drive roll is at rest. When the image forming apparatus operates, the action of the separating means is stopped, thereby allowing the magnetic force imparting means to impart magnetic attraction between the drive roll and the opposing member.

While the drive roll and the opposing member are separated from each other by the separating means when the image forming apparatus is at rest, offset of the transfer belt in the direction at right angles to its travel direction can be corrected. Especially in the cases shown in FIGS. 13 and 14 where the slack section in which no tension is applied to the transfer belt is provided, the transfer belt has a slack in its travel direction from the beginning, so that separating the drive roll from the opposing member frees the entire transfer belt, thereby facilitating offset correction. The correction herein denotes correcting the transfer belt offset accumulated after a long continuous carrying operation to the initial position or generally central position, unlike control for color alignment in the direction at right angles to the belt carrying direction of the toner images of the colors.

The following describes the preferred embodiments of the image forming apparatus according to the present invention.

Embodiment 1

The apparatus under test is as outlined in FIG. 1. Test conditions are as follows:

Photosensitive drum: OPC drum, diameter=20 mm.

Image forming process: roll charge, laser exposure, two-component development (toner color: black), corotron transfer, blade cleaning, heat roll fixing.

Transfer belt: PET, thickness=0.1 mm thick, circumferential length=300 mm, width=240 mm, tension=48N (2N/cm), carrying speed=60 mm/s.

Drive roll: SUS403, urethane rubber sheet surface, diameter D=9.45 mm (30 mm/$\pi$-0.1 mm), effect length=280 mm.

Pinch roll: SUS304 sleeve, diameter=20 mm, effective length=280 mm, surface flux density=0.08 tesla, ferrite magnet roll incorporated.

Figure 15:
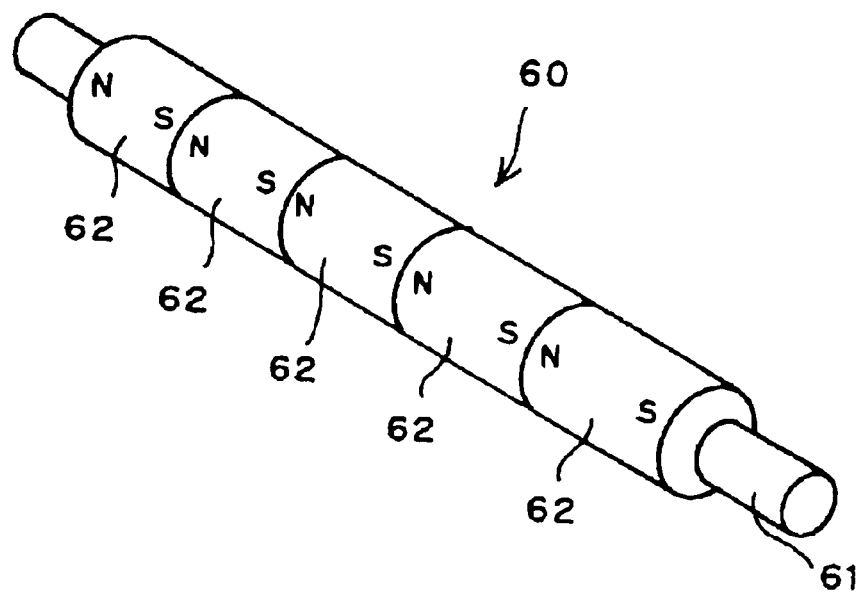
FIG. 15 is a perspective view illustrating an example of a magnetic roll.

FIG. 15 illustrates a schematic constitution of a ferrite magnet roll 60 built in the pinch roll. The ferrite magnet roll 60 comprises a SUS304 shaft 61 having diameter of 8 mm and a magnet member composed of five to eight pipe ferrite magnets 62 having external diameter of 18 mm attached to each other on the shaft 61 in the axial direction. Each ferrite magnet 62 is magnetized with S pole and N pole in the vicinity of both ends thereof. The ferrite magnets 62 are arranged with S pole and N pole thereof contacting with other in the axial direction, namely along the width of the transfer belt. As a result, a uniform magnetic force acts in circumference direction. The ferrite magnets 62 are linked to a sleeve and rotate with the same.

Figure 16:
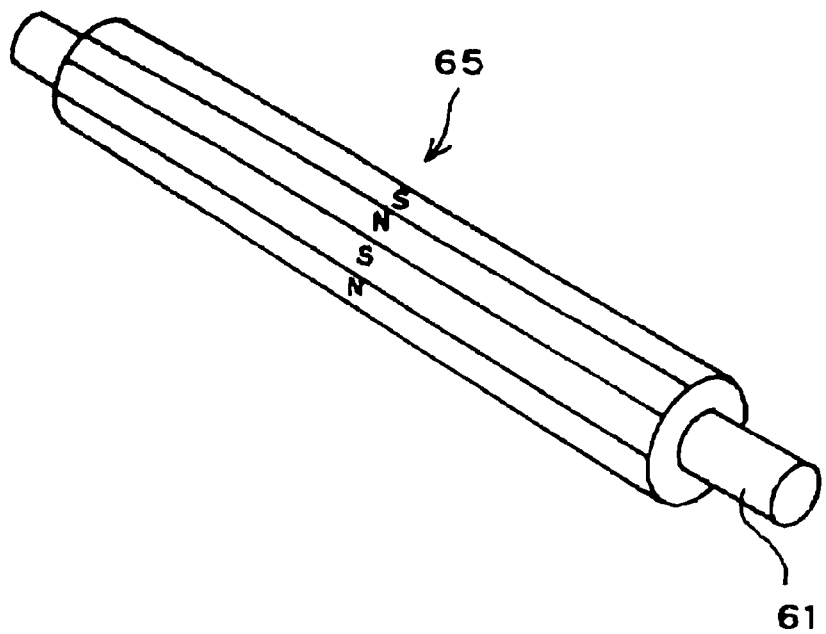
FIG. 16 is a perspective view illustrating another example of the magnetic roll.
Figure 17:
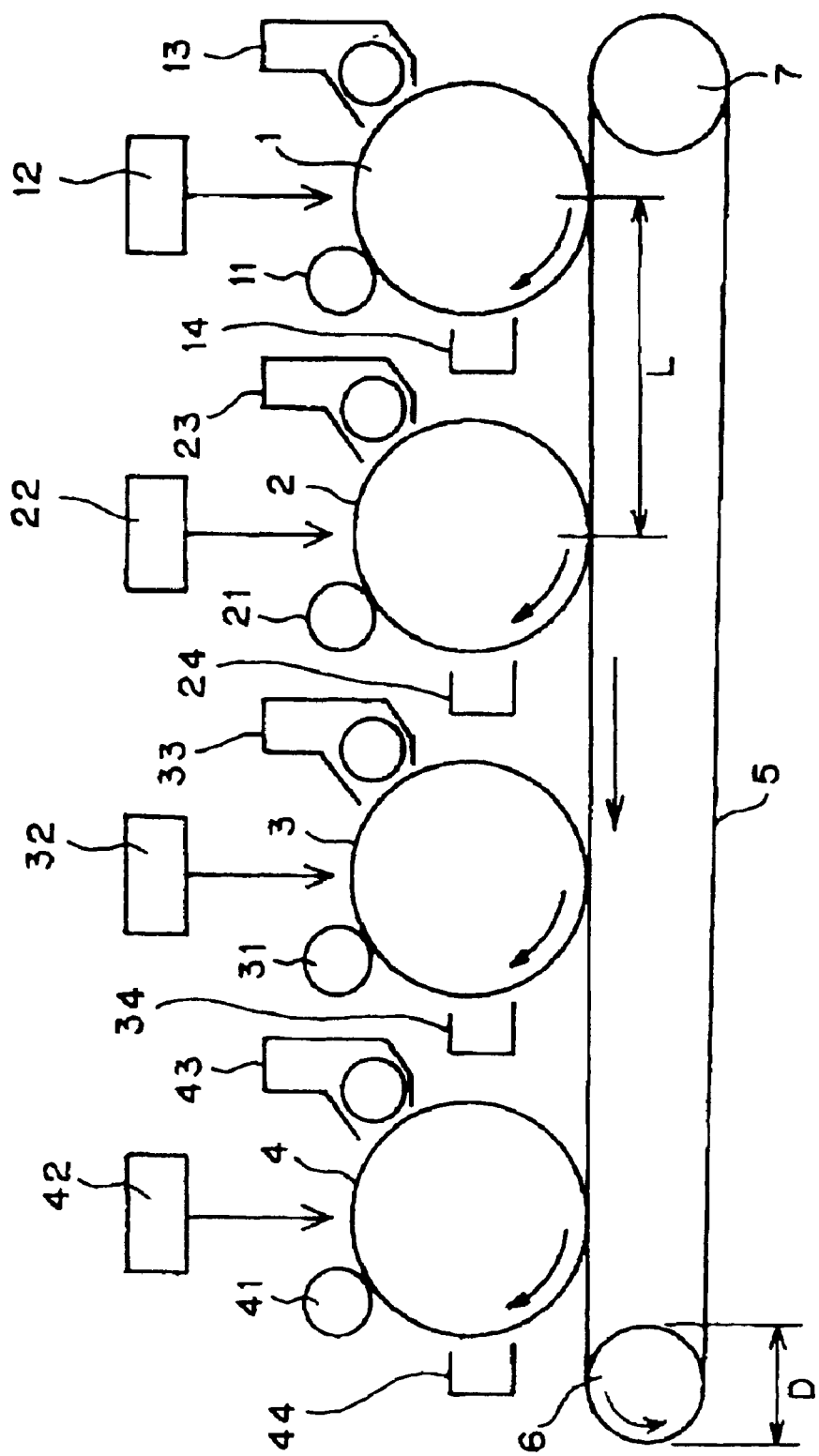
FIG. 17 is a cross section illustrating a schematic constitution of a conventional image forming apparatus.

FIG. 16 illustrates another constitution of the magnet roll. The magnet roll 65 shown is alternately magnetized with S pole and N pole extending axially. In the case of the magnet roll 65 in FIG. 16, a high magnetic force acts at the position of each in the circumferential direction. In this case, it is possible that the rotary speed of the drive roll is modulated in a period in which each magnet of the magnet roll 65 approaches the drive roll. Hence, it is desired that the magnetic poles are adjacently arranged axially as with the magnetic roll 60 shown in FIG. 15. However, the method shown in FIG. 16 in which the magnet roll is alternately magnetized in circumferential direction is practical if magnetization is made with fine sufficient pitches. The magnetic force that acts on the drive roll depends on flux density, the number of magnetic poles, the distance between the drive roll and the magnet, and the material and size of the drive roll. If the magnetic force is too weak, no enough driving force can be obtained; if the magnetic force is too strong, the load for rotating the drive roll becomes large or the drive roll generates excess heat. Therefore, the magnetic force must be set to an appropriate range. In this embodiment, the magnet roll 60 having the construction shown in FIG. 15 was used.

Transferring plain paper by the transfer belt to form a transfer image under the above-mentioned conditions resulted in a good image having no poor transfer. From the value obtained by adding an equivalent belt tension in the rest state, the deflection of the drive roll was estimated to be 6 $\mu$m. A continuous operation of the drive roll for 30 minutes resulted in neither waving nor wrinkle and about 2 mm of the skew of the belt in the 30 minutes.

Embodiment 2

The apparatus under test is as outlined in FIG. 3. The test conditions are generally the same as those of the embodiment 1 except for the following.

Test conditions

Pinch roll: manganese aluminum magnet, diameter=20 mm, effect length=280 mm, surface flux density=0.05 tesla.

The constitution of the pinch roll 8 made of manganese aluminum magnet used in this embodiment is generally similar to the ferrite magnet roll 60 shown in FIG. 15. A difference lies in that the joint between the adjacent magnets is not apparent on the surface and the number of magnets is 14 each being 20 mm long.

Transferring plain paper by the transfer belt to form a transfer image under the above-mentioned conditions resulted in a good image having no poor transfer. From the value obtained by adding an equivalent belt tension in the rest state, the deflection of the drive roll was estimated to be 4 $\mu$m. A continuous operation of the drive roll for 30 minutes resulted in neither waving nor wrinkle and about 2.5 mm of the skew of the belt in the 30 minutes.

Embodiment 3

The apparatus under test is as outlined in FIG. 4. The test conditions are generally the same as those of the embodiment 1 except for the following.

Test conditions

Fixed guide beam: SUS304, thickness=1.0 mm, curved surface radius=15 mm.

Magnet roll: manganese aluminum magnet, diameter=20 mm, effective length=280 mm, surface flux density=0.25 tesla (0.05 tesla on the surface of guide beam).

The transfer belt was wound around the two guide beams 9 and 10 fixed with two side plates, not shown. The tension was adjusted by a third roll-shaped fixed guide beam, not shown. Inside the guide beam 9, the magnet roll 63 was rotatably supported to be mutually attracted to the drive roll 6.

Transferring plain paper by the transfer belt to form a transfer image under the above-mentioned conditions resulted in a good image having no poor transfer. From the value obtained by adding an equivalent belt tension in the rest state, the deflection of the drive roll was estimated to be 8 $\mu$m. A continuous operation of the drive roll for 30 minutes resulted in neither waving nor wrinkle and about 1 mm of the skew of the belt in the 30 minutes.

Embodiment 4

The apparatus under test is as outlined in FIG. 5. The test conditions are generally the same as those of the embodiment 1 except for the following.

Test conditions

Fixed guide beam: SUS304, thickness=1.0 mm, curved surface radius 15 mm.

Pinch roll: same as used in the embodiment 1.

The transfer belt was wound around the two guide beams 9 and 10 fixed with two side plates, not shown. The tension was adjusted by a third roll-shaped fixed guide beam, not shown. The drive roll 6 was arranged inside the transfer belt 5 and at the downstream side of the guide beam 9. In opposition to the drive roll 6, the pinch roll 8 was arranged outside the transfer belt.

Transferring plain paper by the transfer belt to form a transfer image under the above-mentioned conditions resulted in a good image having no poor transfer. From the value obtained by adding an equivalent belt tension in the rest state, the deflection of the drive roll was estimated to be 8 μm. A continuous operation of the drive roll for 30 minutes resulted in neither waving nor wrinkle and less than 1 mm of the skew of the belt in the 30 minutes. In this embodiment 4, the drive roll coated on the surface thereof with urethane rubber touches the transfer belt not on the outside surface thereof but on the rear surface. Consequently, as compared with the embodiment 3, the surface of the drive roll was less contaminated with paper dust or toner.

Embodiment 5

The apparatus under test is as outlined in FIG. 9. Details of the test conditions are as follows.

Test conditions

Photosensitive drum: OPC drum, diameter=20 mm.

Image forming process: roll charge, laser exposure, 2-component development, corotron transfer (color sequence: black, yellow, magenta, cyan), blade cleaning, heat roll fixing.

Transfer belt: PET, thickness=0.1 mm, circumferential length=300 mm, width=240, tension=48N (2N/cm), carrying speed=60 mm/s.

Distance L between adjacent transfer positions: 30 mm.

Drive roll: SUS403, surface urethane rubber coat, diameter d=9.45 mm (30 mm/π–0.1 mm), effective length=280 mm.

Pinch roll: SUS304 sleeve, diameter=20 mm, effective length=280 mm, surface flux density=0.08 tesla, ferrite magnet roll incorporated (refer to FIG. 15).

Transferring plain paper by the transfer belt to form a color transfer image under the above-mentioned conditions resulted in a good image with a maximum color offset of about 80 μm in transfer belt carrying direction and about 100 μm in the direction at right angles to the carrying direction. From the value obtained by adding an equivalent belt tension in the rest state, the deflection of the drive roll was estimated to be 6 μm.

Embodiment 6

The apparatus under test is as outlined in FIG. 10. The test conditions are generally the same as those of the embodiment 5 except for the following.

Test conditions

Magnet roll: manganese aluminum magnet, diameter=20 mm, effective length=280 mm, surface flux density=0.05 tesla.

The constitution of the manganese aluminum magnet used is generally the same that of the ferrite magnet roll 60 shown in FIG. 15. A difference lies in that the joint between the adjacent magnets is not apparent on the surface and the number of magnets is 14 each being 20 mm long.

Transferring plain paper by the transfer belt to form a color transfer image under the above-mentioned conditions resulted in a good image with a maximum color offset of about 110 μm in transfer belt carrying direction and about 100 μm in the direction at right angles to the carrying direction. From the value obtained by adding an equivalent belt tension in the rest state, the deflection of the drive roll was estimated to be 4 μm. As compared with the embodiment 5, the deflection of the drive roll was smaller but the magnitude of the color offset was slightly higher. This is because the eccentricity of the pinch roll around which the carrying belt was wound affected the belt carrying speed.

Embodiment 7

The apparatus under test is as outlined in FIG. 11. The test conditions are generally the same as those of the embodiment 5 except for the following.

Test conditions

Fixed guide beam: SUS304 thickness=1.0 mm, curved surface radius=15 mm.

Magnetic roll: manganese aluminum magnet, diameter= 20 mm, effective length 280 mm, surface flux density=0.25 tesla (0.05 tesla on guide beam surface).

The transfer belt was wound around the two guide beams 9 and 10 fixed with two side plates, not shown. The tension was adjusted by a third roll-shaped fixed guide beam, not shown. Inside the guide beam 9, the magnet roll 63 was rotatably supported to be mutually pressed to the drive roll 6.

Transferring plain paper by the transfer belt to form a color transfer image under the above-mentioned conditions resulted in a good image with a maximum color offset of about 80 μm in transfer belt carrying direction and about 100 μm in the direction at right angles to the carrying direction. From the value obtained by adding an equivalent belt tension in the rest state, the deflection of the drive roll was estimated to be 8 μm.

Embodiment 8

The apparatus under test is as outlined in FIG. 12. The test conditions are generally the same as those of the embodiment 5 except for the following.

Test conditions

Fixed guide beam: SUS304, thickness 1.0 mm, curved surface radius 15 mm.

Pinch roll: the same as that of the embodiment 5.

The transfer belt was wound around the two guide beams 9 and 10 fixed with two side plates, not shown. The tension was adjusted by a third roll-shaped fixed guide beam, not shown. The drive roll 6 was arranged inside the transfer belt 5 and at the downstream side of the guide beam 9. In opposition to the drive roll 6, the pinch roll 8 was arranged outside the transfer belt 5.

Transferring plain paper by the transfer belt to form a color transfer image under the above-mentioned conditions resulted in a good image with a maximum color offset of about 80 μm in transfer belt carrying direction and about 100 μm in the direction at right angles to the carrying direction. From the value obtained by adding an equivalent belt tension in the rest state, the deflection of the drive roll was estimated to be 8 μm. In this embodiment 8, the drive roll coated on the surface thereof with urethane rubber touches the transfer belt not on the outside surface thereof but on the rear surface. Consequently, as compared with the embodiment 7, the surface of the drive roll was less contaminated with paper dust or toner.

Embodiment 9

The apparatus under test is as outlined in FIG. 13. The test conditions are generally the same as those of the embodiment 5 except for the following.

Test conditions

Transfer belt: PET, thickness=0.1 mm, circumferential length=340 mm, width=240 mm, tension=48N (2N/cm), carrying speed 60 mm/s.

Fixed guide beam: SUS304, thickness 1.0 mm, curved surface radius=15 mm.

Pinch roll: the same as that of the embodiment 1.

Brake member: rubber blade, thickness=2 mm, pressing force=7N.

Like the embodiment 8, the transfer belt was wound around the two guide beams 9 and 10 fixed with two side plates, not shown. The drive roll 6 was arranged inside the transfer belt 5 and at the downstream side of the guide beam 9. In opposition to the drive roll 6, the pinch roll 8 was arranged outside the transfer belt 5. However, a slack of 40 mm in circumferential length was given to the carrying belt between the drive roll 6 and the guide beam 10. On the guide beam 10, the rubber blade 71 was pressed against the surface of the transfer belt to generate a braking force. The rubber blade may also have cleaning capability.

Transferring plain paper by the transfer belt to form a color transfer image under the above-mentioned conditions resulted in a good image with a maximum color offset of about 70 μm in transfer belt carrying direction and about 80 μm in the direction at right angles to the carrying direction. From the value obtained by adding an equivalent belt tension in the rest state, the deflection of the drive roll was estimated to be 8 μm as with the embodiment 8.

Figure 18:
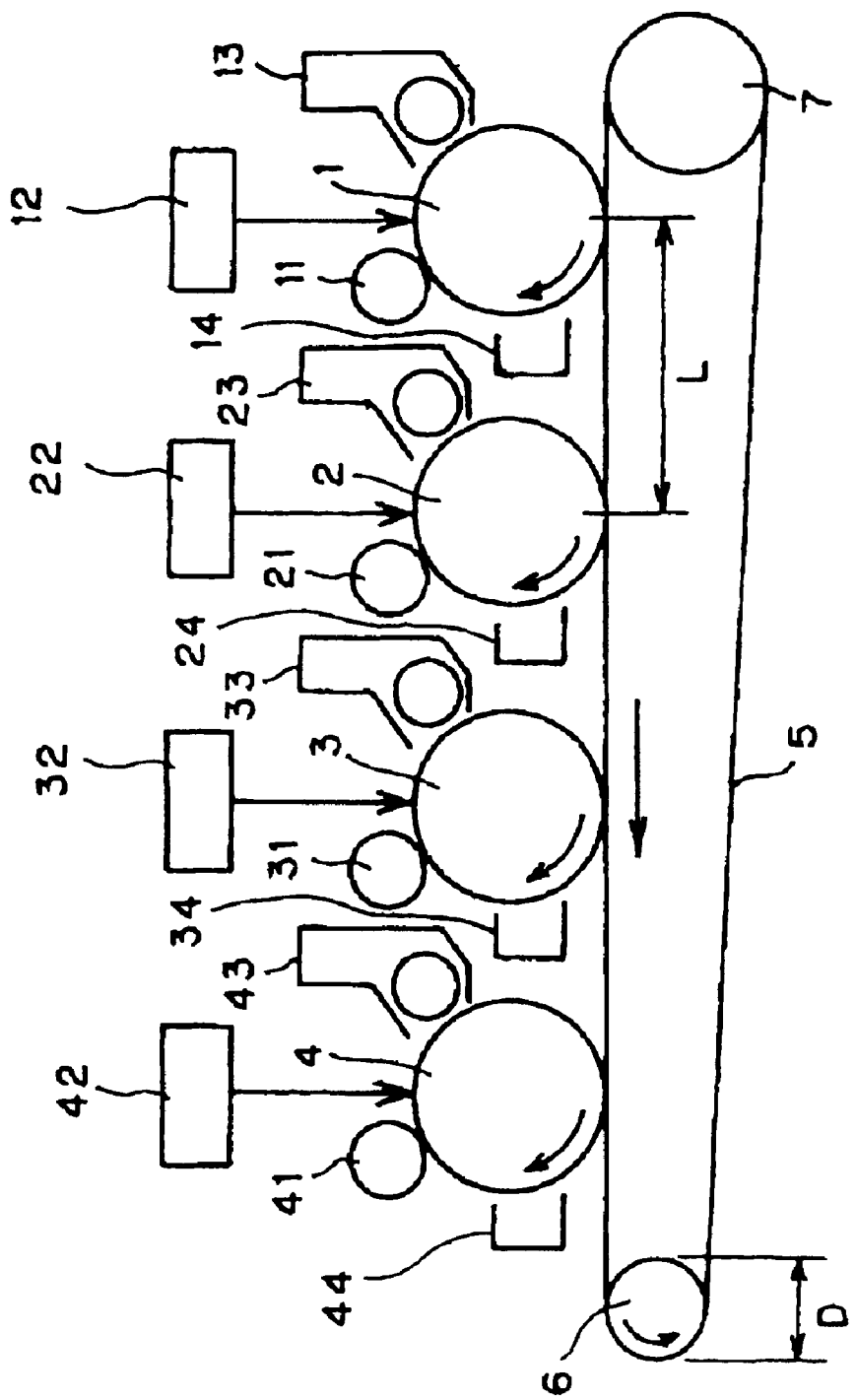
FIG. 18 is a cross section illustrating a schematic constitution of another conventional image forming apparatus.
Figure 19:
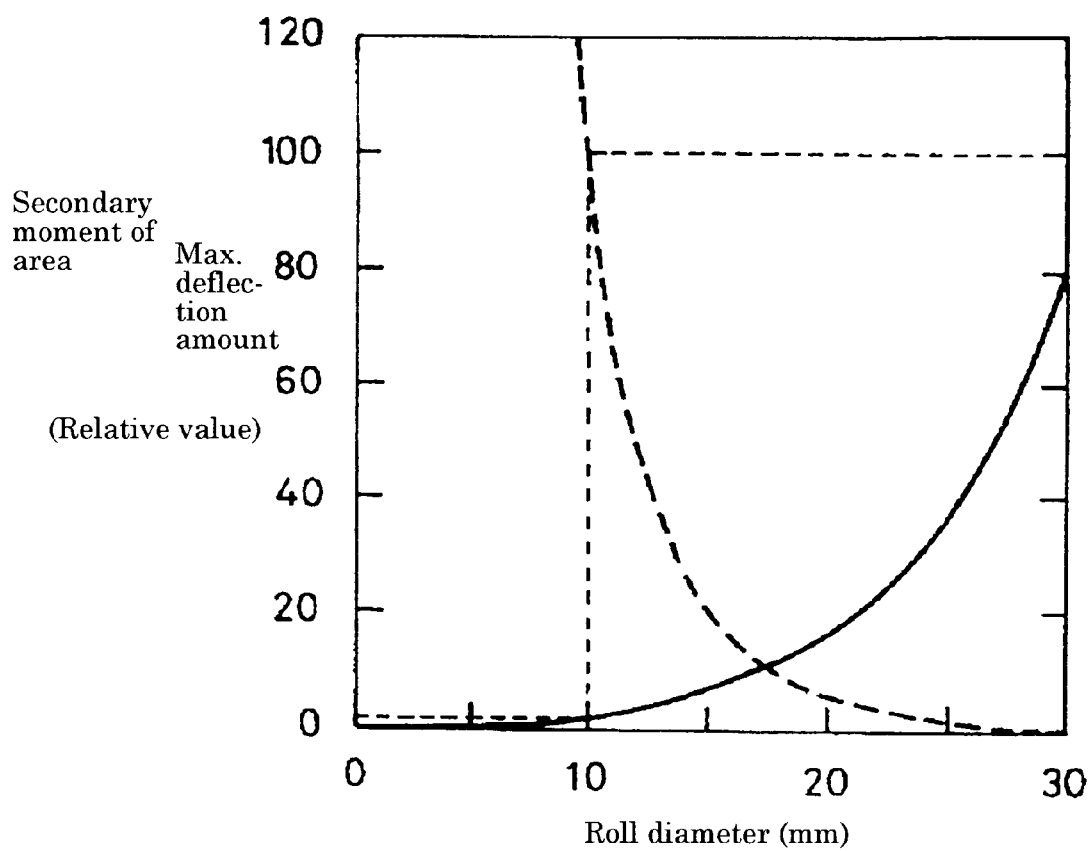
FIG. 19 is a graph illustrating a relationship between a secondary moment of area and a maximum reflection relative to roll diameter.
Figure 20:
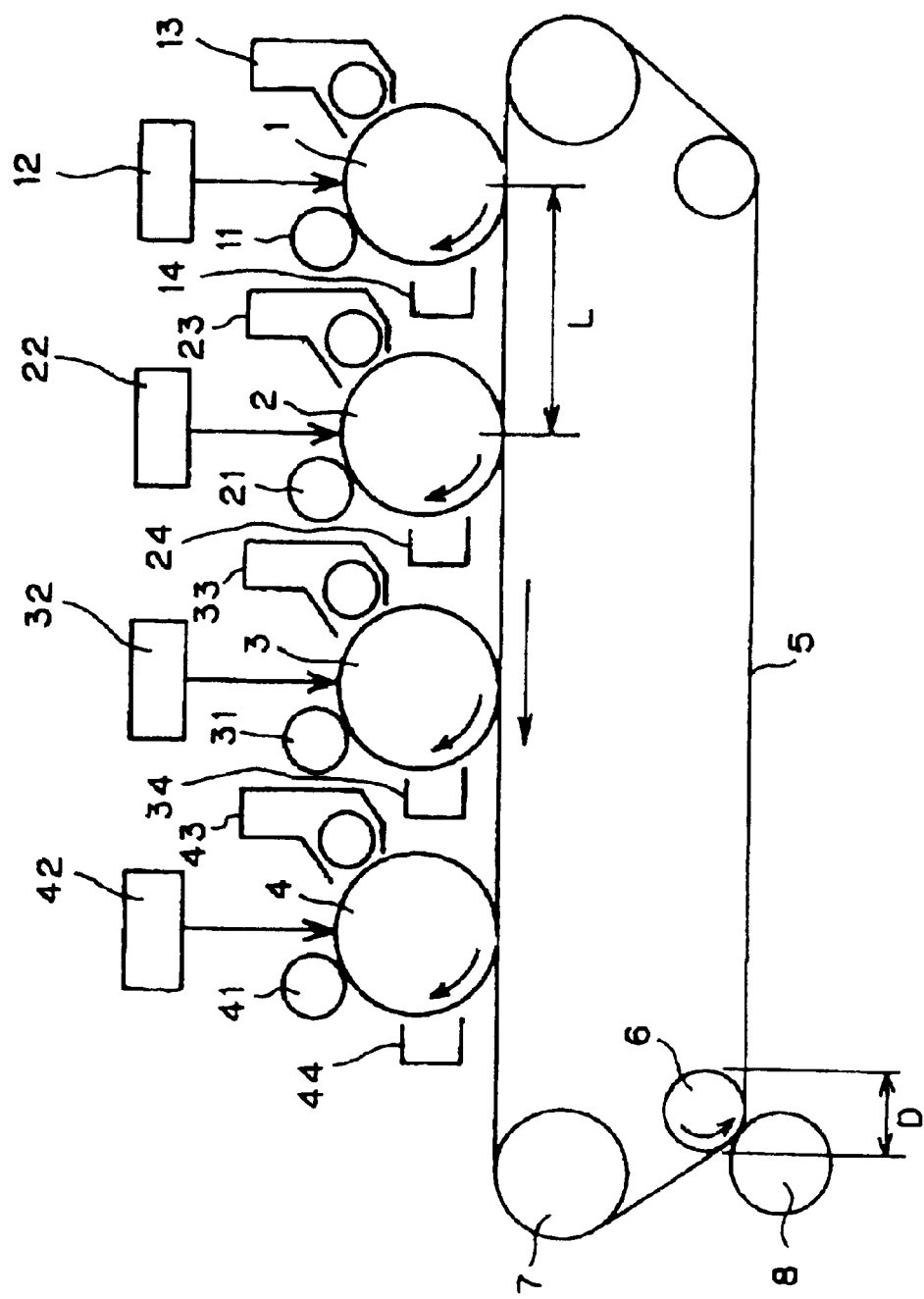
FIG. 20 is a cross section illustrating a schematic constitution of still another conventional image forming apparatus.

The following shows an example of comparison with a conventional image forming apparatus shown in FIG. 18.

Example of comparison

The apparatus under test is as outlined in FIG. 18. Details of test conditions are generally the same as those of the embodiment 5 except for the following.

Test conditions

No member such as a pinch roll opposed to the drive roll 6 was used. The transfer belt was wound around the same drive roll as that of the embodiment 5 to drive the transfer belt.

Transferring plain paper by the transfer belt to form a color transfer image under the above-mentioned conditions resulted in a good image with a maximum color offset of about 500 μm in transfer belt carrying direction and about 250 μm in the direction at right angles to the carrying direction. This color offset was clearly visible and therefore proved a relatively low-grade color image. From the value obtained by adding an equivalent belt tension in the rest state, the deflection of the drive roll was estimated to be 400 μm. Although the diameter D of the drive roll 6 was set to D=L/π, it was estimated that the phases of the colors cannot be aligned effectively.

As described and according to the invention, there is provided an image forming apparatus capable of preventing the toner image carrier or the sheet carrier from being waved or wrinkled even if the dimensions of the apparatus are reduced and the drive roll having a diameter smaller than conventional counterpart is used, thereby forming a high-quality image. There is also provided a sheet carrying apparatus capable of carrying sheets such as paper with stability.

While the preferred embodiments of the present invention have been described using specific terms, such description is for illustrative purposes only, and it is to be understood that changes and variations may be made without departing from the spirit or scope of the appended claims.

What is claimed is:

1. An image forming apparatus comprising:
    a toner image carrier shaped like a belt for supportingly carrying a toner image itself or a toner image support sheet for supporting a toner image;
    toner image forming means for forming a toner image onto said toner image carrier or said toner image support sheet supported on said toner image carrier;
    moving means for moving said toner image carrier, said moving means having a drive roll for driving said toner image carrier and an opposing member arranged in opposition to said drive roll with said toner image carrier in between;
    magnetic force imparting means for making said drive roll and said opposing member press each other by magnetic attraction; and
    fixing means for forming an image constituted by a fixed toner image onto either said toner image support sheet or a toner image transferred sheet that receives transfer of a toner image from said toner image carrier.

2. The image forming apparatus as claimed in claim 1, wherein said toner image forming means have a plurality of image forming units arranged at a predetermined interval along a moving path of said toner image carrier, each of said plurality of image forming units forming a toner image of each color to form a total color toner image onto said toner image carrier or said toner image support sheet, and
    said drive roll has a circumferential length equivalent to said predetermined interval times one divided by an integer.

3. The image forming apparatus as claimed in claim 1, wherein said opposing member is a fixed beam extending along the width of said toner image carrier.

4. The image forming apparatus as claimed in claim 1, wherein said magnetic force imparting means make said drive roll and said opposing member press each other by magnetic attraction, one of said drive roll and said opposing member having a magnetic substance and the other having a magnet.

5. The image forming apparatus as claimed in claim 1, wherein said magnetic force imparting means make said drive roll having a magnetic substance and said opposing member having a magnet press each other by magnetic attraction.

6. The image forming apparatus as claimed in claim 1, wherein said magnetic force imparting means have, at a side opposite to said opposing member and inside said toner image carrier, a free-rotating roll to cause magnetic attraction against said drive roll.

7. The image forming apparatus as claimed in claim 1, wherein said magnetic force imparting means have a magnet member constituted by a plurality of permanent magnets arranged along the width of said toner image support sheet, each of said plurality of permanent magnets having a magnetic pole at each end thereof.

8. The image forming apparatus as claimed in claim 1, wherein said drive roll and said opposing member are detachable from each other and separating means are provided for separating said drive roll and said opposing member from each other when said toner image carrier is at rest.

9. The image forming apparatus as claimed in claim 8, wherein offset correcting means are provided for correcting an offset of said toner image carrier along the width thereof while said drive roll and said opposing member are separated from each other by said separating means.

10. The image forming apparatus as claim in claim 1, wherein said toner image carrier has a slack section in which said toner image carrier is slack in at least one part of an area except an area that contributes to supporting of said toner image.

11. The image forming apparatus as claimed in claim 10, wherein offset correcting means are provided for correcting an offset of said toner image carrier along the width thereof at said slack section.

12. A sheet carrying apparatus comprising:
    a sheet carrier shaped like a belt for supportingly carrying a predetermined sheet;
    a moving means having a drive roll for driving said sheet carrier and an opposing member in opposition to said drive roll with said sheet carrier in between; and
    a magnetic force imparting means for making said drive roll and said opposing member press each other by magnetic attraction.

* * * * *